(12) United States Patent
Su et al.

(10) Patent No.: US 12,431,542 B2
(45) Date of Patent: Sep. 30, 2025

(54) METHODS OF MANUFACTURING BIPOLAR SOLID-STATE BATTERIES

(71) Applicant: GM GLOBAL TECHNOLOGY OPERATIONS LLC, Detroit, MI (US)

(72) Inventors: Qili Su, Shanghai (CN); Mengyan Hou, Shanghai (CN); Zhe Li, Shanghai (CN); Haijing Liu, Shanghai (CN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 589 days.

(21) Appl. No.: 17/697,135

(22) Filed: Mar. 17, 2022

(65) Prior Publication Data

US 2023/0025830 A1 Jan. 26, 2023

(30) Foreign Application Priority Data

Jul. 15, 2021 (CN) .......................... 202110800819.6

(51) Int. Cl.
*H01M 10/0585* (2010.01)
*H01M 4/04* (2006.01)
(Continued)

(52) U.S. Cl.
CPC ..... *H01M 10/0585* (2013.01); *H01M 4/0404* (2013.01); *H01M 4/366* (2013.01);
(Continued)

(58) Field of Classification Search
CPC ......... H01M 10/0585; H01M 10/0565; H01M 4/0404; H01M 4/366; H01M 4/622;
(Continued)

(56) References Cited

U.S. PATENT DOCUMENTS 9,373,869 B2 6/2016 Tanaka
11,145,922 B2 10/2021 Li et al.
(Continued)

FOREIGN PATENT DOCUMENTS

CN 109768334 A 5/2019
CN 115621542 A 1/2023
(Continued)

OTHER PUBLICATIONS

Shyu et al, "Micro-electroforming metallic bipolar electrodes for mini-DMFC stacks," 2008 Symposium on Design, Test, Integration and Packaging of MEMS/MOEMS, Nice, France, 2008, pp. 192-196. (Year: 2008).*
(Continued)

*Primary Examiner* — A. Dexter Tugbang
(74) *Attorney, Agent, or Firm* — Harness, Dickey & Pierce, P.L.C.

(57) ABSTRACT

A method for forming a solid-state battery includes stacking two or more cell units, where each cell unit is formed by substantially aligning a first electrode and a second electrode, the first electrode including one or more first electroactive material layers disposed on or adjacent to one or more surfaces of a releasable substrate and the second electrode including one or more second electroactive material layers disposed on or adjacent to one or more surfaces of a current collector. The method may further include disposing an electrolyte layer between exposed surfaces of the first electrode and the second electrode and removing the releasable substrate to form the cell unit.

20 Claims, 9 Drawing Sheets

(51) Int. Cl.
  *H01M 4/36* (2006.01)
  *H01M 4/62* (2006.01)
  *H01M 10/0565* (2010.01)

(52) U.S. Cl.
  CPC .......... *H01M 4/622* (2013.01); *H01M 4/625* (2013.01); *H01M 10/0565* (2013.01); *H01M 2300/0082* (2013.01); *H01M 2300/0085* (2013.01); *H01M 2300/0091* (2013.01)

(58) Field of Classification Search
  CPC ............... H01M 4/625; H01M 10/02; H01M 2300/0082; H01M 2300/0085; H01M 2300/0091
  See application file for complete search history.

(56) References Cited

U.S. PATENT DOCUMENTS

| | | | |
|---|---|---|---|
| 11,205,798 | B2 | 12/2021 | Li et al. |
| 11,217,826 | B2 | 1/2022 | Li et al. |
| 2011/0068001 | A1* | 3/2011 | Affinito ............... H01M 4/662 156/247 |
| 2017/0207482 | A1 | 7/2017 | Tomura et al. |
| 2017/0239931 | A1* | 8/2017 | Wolk ................... H01M 10/02 |
| 2018/0138513 | A1 | 5/2018 | Dai et al. |
| 2019/0088958 | A1* | 3/2019 | Viner ................... H01M 4/622 |
| 2020/0119357 | A1 | 4/2020 | Hou et al. |
| 2020/0190233 | A1* | 6/2020 | Hirai ................ H01M 10/0565 |
| 2020/0403267 | A1 | 12/2020 | Li et al. |
| 2021/0020929 | A1 | 1/2021 | Kong et al. |
| 2021/0028481 | A1 | 1/2021 | Hou et al. |
| 2021/0036310 | A1 | 2/2021 | Hou et al. |
| 2021/0036360 | A1 | 2/2021 | Li et al. |
| 2021/0050157 | A1 | 2/2021 | Hou et al. |
| 2021/0050596 | A1 | 2/2021 | Li et al. |
| 2021/0057776 | A1 | 2/2021 | Lu et al. |
| 2021/0066746 | A1 | 3/2021 | Hou et al. |
| 2021/0111426 | A1 | 4/2021 | Li et al. |
| 2021/0135224 | A1 | 5/2021 | Hou et al. |
| 2022/0102756 | A1 | 3/2022 | Frieberg et al. |
| 2022/0123352 | A1 | 4/2022 | Li et al. |
| 2022/0140422 | A1 | 5/2022 | Chen et al. |
| 2022/0166031 | A1 | 5/2022 | Li et al. |
| 2022/0181598 | A1 | 6/2022 | Lu et al. |
| 2022/0181685 | A1 | 6/2022 | Li et al. |
| 2022/0263055 | A1 | 8/2022 | Hou et al. |
| 2022/0263129 | A1 | 8/2022 | Lu et al. |

FOREIGN PATENT DOCUMENTS

| | | | |
|---|---|---|---|
| DE | 102022103138 | A1 | 1/2023 |
| JP | 2007250405 | A | 9/2007 |
| JP | 2014238925 | A | 12/2014 |
| JP | 2017134999 | A * | 8/2017 |
| JP | 2019169444 | A | 10/2019 |

OTHER PUBLICATIONS

First Office Action for corresponding Chinese Patent Application No. 202110800819.6 issued Jun. 12, 2025, with correspondence from China Patent Agent (H.K.) Ltd summarizing Office Action; 30 pages.

* cited by examiner

METHODS OF MANUFACTURING BIPOLAR SOLID-STATE BATTERIES

CROSS-REFERENCE TO RELATED APPLICATIONS

This application claims the benefit of Chinese Patent Application No. 202110800819.6, filed Jul. 15, 2021. The entire disclosure of the above application is incorporated herein by reference.

INTRODUCTION

This section provides background information related to the present disclosure which is not necessarily prior art.

Electrochemical energy storage devices, such as lithium-ion batteries, can be used in a variety of products, including automotive products such as start-stop systems (e.g., 12V start-stop systems), battery-assisted systems ("μBAS"), Hybrid Electric Vehicles ("HEVs"), and Electric Vehicles ("EVs"). Typical lithium-ion batteries include two electrodes and an electrolyte component and/or separator. One of the two electrodes can serve as a positive electrode or cathode, and the other electrode can serve as a negative electrode or anode. Lithium-ion batteries may also include various terminal and packaging materials. Rechargeable lithium-ion batteries operate by reversibly passing lithium ions back and forth between the negative electrode and the positive electrode. For example, lithium ions may move from the positive electrode to the negative electrode during charging of the battery and in the opposite direction when discharging the battery. A separator and/or electrolyte may be disposed between the negative and positive electrodes. The electrolyte is suitable for conducting lithium ions between the electrodes and, like the two electrodes, may be in a solid form, a liquid form, or a solid-liquid hybrid form. In the instances of solid-state batteries, which includes a solid-state electrolyte layer disposed between solid-state electrodes, the solid-state electrolyte physically separates the solid-state electrodes so that a distinct separator is not required.

Solid-state batteries have advantages over batteries that include a separator and a liquid electrolyte. These advantages can include a longer shelf life with lower self-discharge, simpler thermal management, a reduced need for packaging, and the ability to operate within a wider temperature window. For example, solid-state electrolytes are generally non-volatile and non-flammable, so as to allow cells to be cycled under harsher conditions without experiencing diminished potential or thermal runaway, which can potentially occur with the use of liquid electrolytes. However, common methods of manufacturing bipolar solid-state batteries often experience deformation and contamination, resulting in reduced or diminished productivity. Accordingly, it would be desirable to develop methods for making high-performance solid-state batteries that minimize or eliminate manufacturing process failures, like deformation and contamination.

SUMMARY

This section provides a general summary of the disclosure, and is not a comprehensive disclosure of its full scope or all of its features.

The present disclosure relates to solid-state batteries (SSBs), for example bipolar solid-state batteries, and methods of forming the same using releasable substrates.

In various aspects, the present disclosure provides a method for forming a cell unit for a solid-state battery. The method may include substantially aligning a first electrode and a second electrode. The first electrode may include one or more first electroactive material layers disposed on or adjacent to one or more surfaces of a releasable substrate. The second electrode may include one or more second electroactive material layers disposed on or adjacent to one or more surfaces of a current collector. The method may further includes disposing an electrolyte layer between exposed surfaces of the first electrode and the second electrode and removing the releasable substrate to form the cell unit.

In one aspect, the releasable substrate may be a film having a thickness greater than or equal to about 2 μm to less than or equal to about 1,000 μm.

In one aspect, the releasable substrate may include at least one of a polymer and a metal. The polymer may be selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof. The metal may be selected from the group consisting of: copper, aluminum, titanium, iron, and combinations thereof.

In one aspect, the releasable substrate may include a polymer. The releasable substrate may further include greater one or more fillers. The releasable substrate may include greater than 0 wt. % to less than or equal to about 50 wt. % of one or more fillers. The one or more fillers may be selected from the group consisting of: aluminum oxide ($Al_2O_3$), silicon dioxide ($SiO_2$), magnesium oxide (MgO), carbon, or any combination thereof.

In one aspect, the method may further include disposing the one or more second electroactive material layers on the one or more surfaces of the current collector.

In one aspect, the method may further include coating an electrically conductive adhesive layer on the one or more surfaces of the current collector and disposing the one or more second electroactive material layers on the one or more surfaces of the current collector may include disposing the one or more second electroactive material layers on one or more exposed surfaces of the electrically conductive adhesive layer.

In one aspect, the electrically conductive adhesive layer may have a thickness greater than or equal to about 0.5 μm to less than or equal to about 20 μm.

In one aspect, the electrically conductive adhesive layer may include greater than or equal to about 0.1 wt. % to less than or equal to about 50 wt. % of a polymer and greater than or equal to about 0.1 wt. % to less than or equal to about 50 wt. % of a conductive filler. The polymer may be selected from the group consisting of: epoxy, polyimide (polyamic acid), polyester, vinyl ester, polyvinylidene difluoride (PVDF), polyamide, silicone, acrylic, polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and combinations thereof. The conductive filler may be selected from the group consisting of: carbon black, graphene, carbon nanotubes, carbon nanofibers, gold (Ag), nickel (Ni), aluminum (Al), and combinations thereof.

In one aspect, the electrolyte layer may include a free-standing electrolyte membrane. The free-standing electrolyte membrane may have a thickness greater than or equal to about 1 μm to less than or equal to about 200 μm.

In one aspect, the free-standing electrolyte membrane may be a polymeric gel layer. The polymeric gel layer may include one or more polymers selected from the group consisting of: poly(acrylonitrile) (PAN), poly(ethylene oxide) (PEO)/(poly(ethylene glycol)) (PEG), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

In one aspect, the polymeric gel layer may further include greater than or equal to about 5 wt. % to less than or equal to about 70 wt. % of a lithium salt. The lithium salt may be selected from the group consisting of: lithium bis(trifluoromethylsulfonyl)imide (LiTFSI), lithium tetrafluoroborate ($LiBF_4$), lithium bis(oxalate)borate (LiBOB), lithium difluoro(oxalato) borate (LiODFB), lithium difluorophosphate ($LiPO_2F_2$), lithium fluoride (LiF), and combinations thereof.

In one aspect, the polymeric gel layer may further include greater than 0 wt. % to less than or equal to about 80 wt. % of a plasticizer. The plasticizer may be selected from the group consisting of: dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols, and combinations thereof.

In one aspect, the electrolyte layer may further include a plurality of solid-state electrolyte particles. The plurality of solid-state electrolyte particles may form one or more particle layers disposed on or adjacent to one or more surfaces of the free-standing electrolyte membrane.

In one aspect, the cell unit may be a single cell bipolar unit, where the one or more first electroactive material layers include a first electroactive material layer that is disposed on or adjacent to a first surface of the one or more surfaces of the releasable substrate; and the one or more second electroactive material layers include a first electroactive material layer disposed on or adjacent to a first surface of the one or more surfaces of the current collector.

In one aspect, the cell unit may be a bi-cell bipolar unit, where the one or more first electroactive material layers include a first electroactive material layer disposed on or adjacent to a first surface of the one or more surfaces of the releasable substrate and a second electroactive material layer disposed on or adjacent to a second surface of the one or more surfaces of the releasable substrate; the one or more second electroactive material layers include a first electroactive material layer disposed on or adjacent to a first surface of the one or more surfaces of the current collector and a second electroactive material layer disposed on or adjacent to a second surface of the one or more surfaces of the current collector; and removing the releasable substrate includes removing the releasable substrate and the second electroactive material layer of the one or more first electroactive material layers disposed on or adjacent to the second surface of the one or more surfaces of the releasable substrate.

In various aspect, the present disclosure provides a method for forming a cell unit for a solid-state battery. The method may include substantially aligning one or more first electrodes and a second electrode. Each of one or more first electrodes may include one or more first electroactive material layers disposed on or adjacent to one or more surfaces of a releasable substrate. The second electrode may include one or more second electroactive material layers disposed on or adjacent to one or more surfaces of a current collector. The method may further include disposing a free-standing electrolyte membrane between exposed surfaces of the one or more first electrode and the second electrode and removing the releasable substrate to form the cell unit.

In one aspect, the releasable substrate may be a film having a thickness greater than or equal to about 2 μm to less than or equal to about 1,000 μm.

In one aspect, the releasable substrate may include at least one of a polymer and a metal. The polymer may be selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof. The metal may be selected from the group consisting of: copper, aluminum, titanium, iron, and combinations thereof.

In one aspect, the free-standing electrolyte membrane may be a polymeric gel layer.

In one aspect, the polymeric gel layer may include a polymer. The polymer may be selected from the group consisting of: poly(acrylonitrile) (PAN), poly(ethylene oxide) PEO)/(poly(ethylene glycol)) (PEG), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

In one aspect, the polymeric gel may include a lithium salt. The lithium salt may be selected from the group consisting of: lithium bis(trifluoromethylsulfonyl)imide (LiTFSI), lithium tetrafluoroborate ($LiBF_4$), lithium bis(oxalate)borate (LiBOB), lithium difluoro(oxalato) borate (LiODFB), lithium difluorophosphate ($LiPO_2F_2$), lithium fluoride (LiF), and combinations thereof.

In one aspect, the polymeric gel may include a plasticizer. The plasticizer may be selected from the group consisting of: dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols, and combinations thereof.

In one aspect, a plurality of solid-state electrolyte particles may form one or more particle layers disposed on or adjacent to one or more surfaces of the free-standing electrolyte membrane.

In one aspect, one or more surfaces of the current collector may be coated with an electrically conductive adhesive layer.

In one aspect, the electrically conductive adhesive layer may have a thickness greater than or equal to about 0.5 μm to less than or equal to about 20 μm.

In one aspect, the electrically conductive adhesive layer may include greater than or equal to about 0.1 wt. % to less than or equal to about 50 wt. % of a polymer and greater than or equal to about 0.1 wt. % to less than or equal to about 50 wt. % of a conductive filler.

In one aspect, the cell unit is a bi-cell bipolar unit, where the one or more first electroactive material layers includes a first electroactive material layer disposed on or adjacent to a first surface of the one or more surfaces of the releasable substrate and a second electroactive material layer disposed on or adjacent to a second surface of the one or more surfaces of the releasable substrate; the one or more second electroactive material layers includes a first electroactive material layer disposed on or adjacent to a first surface of the one or more surfaces of the current collector and a second electroactive material layer disposed on or adjacent to a second surface of the one or more surfaces of the current collector; substantially aligning the one or more first electrodes and a second electrode includes substantially aligning a bottom electrode of the one or more first electrodes with a first exposed surface of the second electrode and substantially aligning a top electrode of the one or more first electrodes with a second exposed surface of the second electrode; and removing the releasable substrate includes removing the releasable substrate and the second electroactive material layer disposed on or adjacent to the second surface of the one or more surfaces of the releasable substrate of the bottom electrode of the one or more first electrodes and the releasable substrate and the second electroactive material layer disposed on or adjacent to the second surface of the one or more surfaces of the releasable substrate of the top electrode of the one or more first electrodes.

In various aspects, the present disclosure provides a method for forming a solid-state battery. The method may include stacking two or more cell units, where each cell unit is formed by: substantially aligning a first electrode and a second electrode, where the first electrode includes one or more first electroactive material layers disposed on or adjacent to one or more surfaces of a releasable substrate and the second electrode includes one or more second electroactive material layers disposed on or adjacent to one or more surfaces of a current collector; disposing an electrolyte layer between exposed surfaces of the first electrode and the second electrode; and removing the releasable substrate to form the cell unit.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
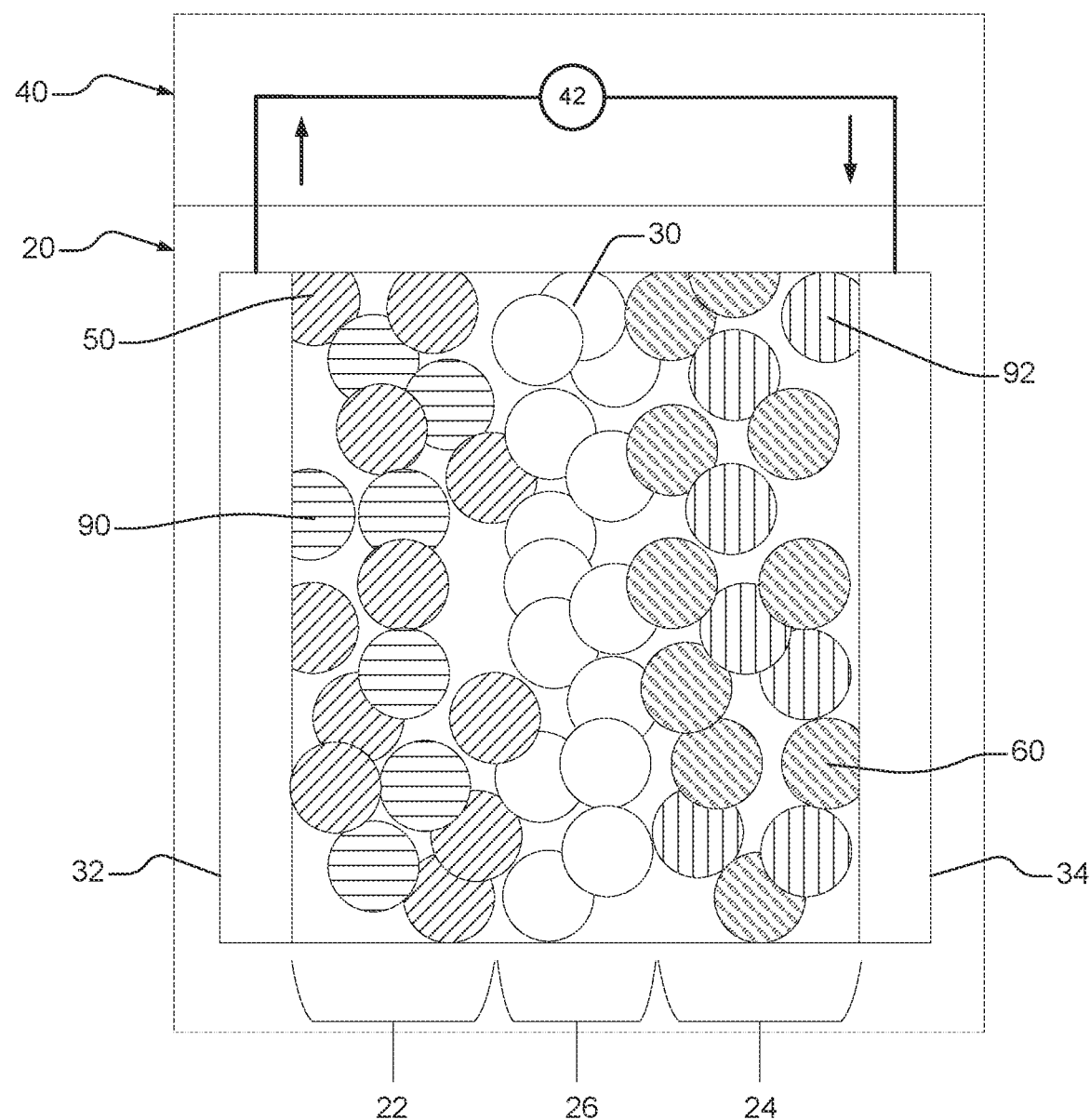
FIG. 1 is an illustration of an example solid-state battery in accordance with various aspects of the present disclosure.

Example embodiments are provided so that this disclosure will be thorough, and will fully convey the scope to those who are skilled in the art. Numerous specific details are set forth such as examples of specific compositions, components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, elements, compositions, steps, integers, operations, and/or components, but do not preclude the presence or addition of one or more other features, integers, steps, operations, elements, components, and/or groups thereof. Although the open-ended term "comprising" is to be understood as a non-restrictive term used to describe and claim various embodiments set forth herein, in certain aspects, the term may alternatively be understood to instead be a more limiting and restrictive term, such as "consisting of" or "consisting essentially of." Thus, for any given embodiment reciting compositions, materials, components, elements, features, integers, operations, and/or process steps, the present disclosure also specifically includes embodiments consisting of, or consisting essentially of, such recited compositions, materials, components, elements, features, integers, operations, and/or process steps. In the case of "consisting of," the alternative embodiment excludes any additional compositions, materials, components, elements, features, integers, operations, and/or process steps, while in the case of "consisting essentially of," any additional compositions, materials, components, elements, features, integers, operations, and/or process steps that materially affect the basic and novel characteristics are excluded from such an embodiment, but any compositions, materials, components, elements, features, integers, operations, and/or process steps that do not materially affect the basic and novel characteristics can be included in the embodiment.

Any method steps, processes, and operations described herein are not to be construed as necessarily requiring their performance in the particular order discussed or illustrated, unless specifically identified as an order of performance. It is also to be understood that additional or alternative steps may be employed, unless otherwise indicated.

When a component, element, or layer is referred to as being "on," "engaged to," "connected to," or "coupled to" another element or layer, it may be directly on, engaged, connected or coupled to the other component, element, or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various steps, elements, components, regions, layers and/or sections, these steps, elements, components, regions, layers and/or sections should not be limited by these terms, unless otherwise indicated. These terms may be only used to distinguish one step, element, component, region, layer or section from another step, element, component, region, layer or section. Terms such as "first," "second," and other numerical terms when used herein do not imply a sequence or order unless clearly indicated by the context. Thus, a first step, element, component, region, layer or section discussed below could be termed a second step, element, component, region, layer or section without departing from the teachings of the example embodiments.

Spatially or temporally relative terms, such as "before," "after," "inner," "outer," "beneath," "below," "lower," "above," "upper," and the like, may be used herein for ease of description to describe one element or feature's relationship to another element(s) or feature(s) as illustrated in the figures. Spatially or temporally relative terms may be intended to encompass different orientations of the device or system in use or operation in addition to the orientation depicted in the figures.

Throughout this disclosure, the numerical values represent approximate measures or limits to ranges to encompass minor deviations from the given values and embodiments having about the value mentioned as well as those having exactly the value mentioned. Other than in the working examples provided at the end of the detailed description, all numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. For example, "about" may comprise a variation of less than or equal to 5%, optionally less than or equal to 4%, optionally less than or equal to 3%, optionally less than or equal to 2%, optionally less than or equal to 1%, optionally less than or equal to 0.5%, and in certain aspects, optionally less than or equal to 0.1%.

In addition, disclosure of ranges includes disclosure of all values and further divided ranges within the entire range, including endpoints and sub-ranges given for the ranges.

Example embodiments will now be described more fully with reference to the accompanying drawings.

The current technology pertains to solid-state batteries (SSBs), for example only, bipolar solid-state batteries, and methods of forming and using the same. Solid-state batteries may include at least one solid component, for example, at least one solid electrode, but may also include semi-solid or gel, liquid, or gas components, in certain variations. Solid-state batteries may have a bipolar stacking design comprising a plurality of bipolar electrodes where a first mixture of solid-state electroactive material particles (and optional solid-state electrolyte particles) is disposed on a first side of a current collector, and a second mixture of solid-state electroactive material particles (and optional solid-state electrolyte particles) is disposed on a second side of a current collector that is parallel with the first side. The first mixture may include, as the solid-state electroactive material particles, cathode material particles. The second mixture may include, as solid-state electroactive material particles, anode material particles. The solid-state electrolyte particles in each instance may be the same or different.

Such solid-state batteries may be incorporated into energy storage devices, like rechargeable lithium-ion batteries, which may be used in automotive transportation applications (e.g., motorcycles, boats, tractors, buses, mobile homes, campers, and tanks). The present technology, however, may also be used in other electrochemical devices, including aerospace components, consumer goods, devices, buildings (e.g., houses, offices, sheds, and warehouses), office equipment and furniture, and industrial equipment machinery, agricultural or farm equipment, or heavy machinery, by way of non-limiting example. In various aspects, the present disclosure provides a rechargeable lithium-ion battery that exhibits high temperature tolerance, as well as improved safety and superior power capability and life performance.

An exemplary and schematic illustration of a solid-state electrochemical cell unit (also referred to as a "solid-state battery" and/or "battery") 20 that cycles lithium ions is shown in FIG. 1. The battery 20 includes a negative electrode (i.e., anode) 22, a positive electrode (i.e., cathode) 24, and an electrolyte layer 26 that occupies a space defined between the two or more electrodes. The electrolyte layer 26 is a solid-state or semi-solid state separating layer that physically separates the negative electrode 22 from the positive electrode 24. The electrolyte layer 26 may include a first plurality of solid-state electrolyte particles 30. A second plurality of solid-state electrolyte particles 90 may be mixed with negative solid-state electroactive particles 50 in the negative electrode 22, and a third plurality of solid-state electrolyte particles 92 may be mixed with positive solid-state electroactive particles 60 in the positive electrode 24, so as to form a continuous electrolyte network, which may be a continuous lithium-ion conduction network.

A negative electrode current collector 32 may be positioned at or near the negative electrode 22. A positive electrode current collector 34 may be positioned at or near the positive electrode 24. The negative electrode current collector 32 may be formed from copper or any other appropriate electrically conductive material known to those of skill in the art. The positive electrode current collector 34 may be formed from aluminum or any other electrically conductive material known to those of skill in the art. The negative electrode current collector 32 and the positive electrode current collector 34 respectively collect and move free electrons to and from an external circuit 40 (as shown by the block arrows). For example, an interruptible external circuit 40 and a load device 42 may connect the negative electrode 22 (through the negative electrode current collector 32) and the positive electrode 24 (through the positive electrode current collector 34).

The battery 20 can generate an electric current (indicated by arrows in FIG. 1) during discharge by way of reversible electrochemical reactions that occur when the external circuit 40 is closed (to connect the negative electrode 22 and the positive electrode 24) and when the negative electrode 22 has a lower potential than the positive electrode 24. The chemical potential difference between the negative electrode 22 and the positive electrode 24 drives electrons produced by a reaction, for example, the oxidation of intercalated lithium, at the negative electrode 22, through the external circuit 40 towards the positive electrode 24. Lithium ions, which are also produced at the negative electrode 22, are concurrently transferred through the electrolyte layer 26 towards the positive electrode 24. The electrons flow through the external circuit 40 and the lithium ions migrate across the electrolyte layer 26 to the positive electrode 24, where they may be plated, reacted, or intercalated. The electric current passing through the external circuit 40 can be harnessed and directed through the load device 42 (in the direction of the arrows) until the lithium in the negative electrode 22 is depleted and the capacity of the battery 20 is diminished.

The battery 20 can be charged or reenergized at any time by connecting an external power source (e.g., charging device) to the battery 20 to reverse the electrochemical reactions that occur during battery discharge. The external power source that may be used to charge the battery 20 may vary depending on the size, construction, and particular end-use of the battery 20. Some notable and exemplary external power sources include, but are not limited to, an AC-DC converter connected to an AC electrical power grid though a wall outlet and a motor vehicle alternator. The connection of the external power source to the battery 20 promotes a reaction, for example, non-spontaneous oxidation of intercalated lithium, at the positive electrode 24 so that electrons and lithium ions are produced. The electrons, which flow back towards the negative electrode 22 through the external circuit 40, and the lithium ions, which move across the electrolyte layer 26 back towards the negative electrode 22, reunite at the negative electrode 22 and replenish it with lithium for consumption during the next battery discharge cycle. As such, a complete discharging event followed by a complete charging event is considered to be a cycle, where lithium ions are cycled between the positive electrode 24 and the negative electrode 22.

Though the illustrated example includes a single positive electrode 24 and a single negative electrode 22, the skilled artisan will recognize that the current teachings apply to various other configurations, including those having one or more cathodes and one or more anodes, as well as various current collectors and current collector films with electroactive particle layers disposed on or adjacent to or embedded within one or more surfaces thereof. Likewise, it should be recognized that the battery 20 may include a variety of other components that, while not depicted here, are nonetheless known to those of skill in the art. For example, the battery 20 may include a casing, a gasket, terminal caps, and any other conventional components or materials that may be situated within the battery 20, including between or around the negative electrode 22, the positive electrode 24, and/or the solid-state electrolyte 26 layer.

In many configurations, each of the negative electrode current collector 32, the negative electrode 22, the electrolyte layer 26, the positive electrode 24, and the positive electrode current collector 34 are prepared as relatively thin layers (for example, from several microns to a millimeter or less in thickness) and assembled in layers connected in series arrangement to provide a suitable electrical energy, battery voltage and power package, for example, to yield a Series-Connected Elementary Cell Core ("SECC"). In various other instances, the battery 20 may further include electrodes 22, 24 connected in parallel to provide suitable electrical energy, battery voltage, and power for example, to yield a Parallel-Connected Elementary Cell Core ("PECC").

The size and shape of the battery 20 may vary depending on the particular applications for which it is designed. Battery-powered vehicles and hand-held consumer electronic devices are two examples where the battery 20 would most likely be designed to different size, capacity, voltage, energy, and power-output specifications. The battery 20 may also be connected in series or parallel with other similar lithium-ion cells or batteries to produce a greater voltage output, energy, and power if it is required by the load device 42. The battery 20 can generate an electric current to the load device 42 that can be operatively connected to the external circuit 40. The load device 42 may be fully or partially powered by the electric current passing through the external circuit 40 when the battery 20 is discharging. While the load device 42 may be any number of known electrically-powered devices, a few specific examples of power-consuming load devices include an electric motor for a hybrid vehicle or an all-electric vehicle, a laptop computer, a tablet computer, a cellular phone, and cordless power tools or appliances, by way of non-limiting example. The load device 42 may also be an electricity-generating apparatus that charges the battery 20 for purposes of storing electrical energy.

With renewed reference to FIG. 1, the electrolyte layer 26 provides electrical separation-preventing physical contact-between the negative electrode 22 and the positive electrode 24. The electrolyte layer 26 also provides a minimal resistance path for internal passage of ions. In various aspects, the electrolyte layer 26 is a free-standing electrolyte membrane. For example, the electrolyte layer 26 may be a polymeric gel layer having a thickness greater than or equal to about 1 µm to less than or equal to about 200 µm and a tensile strength greater than or equal to about 0.1 MPa. The polymeric gel layer may include one or more polymers (not illustrated). The one or more polymers may be selected from the group consisting of: poly(acrylonitrile) (PAN), poly (ethylene oxide) (PEO)/(poly(ethylene glycol)) (PEG), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

In various aspects, the polymeric gel layer may include one or more lithium salts. For example, the electrolyte layer 26 may be in the form of a layer or a composite that includes the one or more lithium salts. The one or more lithium salts may be dispersed within a polymeric matrix defined by the one or more polymers. The one or more lithium salts may be selected from the group consisting of: lithium bis(trifluoromethylsulfonyl)imide (LiTFSI), lithium tetrafluoroborate (LiBF$_4$), lithium bis(oxalate)borate (LiBOB), lithium difluoro(oxalato) borate (LiODFB), lithium difluorophosphate (LiPO$_2$F$_2$), lithium fluoride (LiF), and combinations thereof. The polymeric gel layer may include greater than or equal to about 1 wt. % to less than or equal to about 90 wt. % of the one or more polymers, and greater than or equal to about 0 wt. % to less than or equal to about 70 wt. %, and in certain aspects, optionally greater than or equal to about 5 wt. % to less than or equal to about 70 wt. %, of the one or more lithium salts.

In various aspects, the polymeric gel layer may include one or more plasticizers. For example, the electrolyte layer 26 may be in the form of a layer or a composite that includes the one or more plasticizers. The one or more plasticizers may be dispersed within a polymeric matrix defined by the one or more polymers. The one or more plasticizers may be selected from dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols (such as isopropyl alcohol and butanol), or any combination thereof. The polymeric gel layer may include greater than or equal to about 0 wt. % to less than or equal to about 80 wt. % of the one or more plasticizers.

Figure 3:
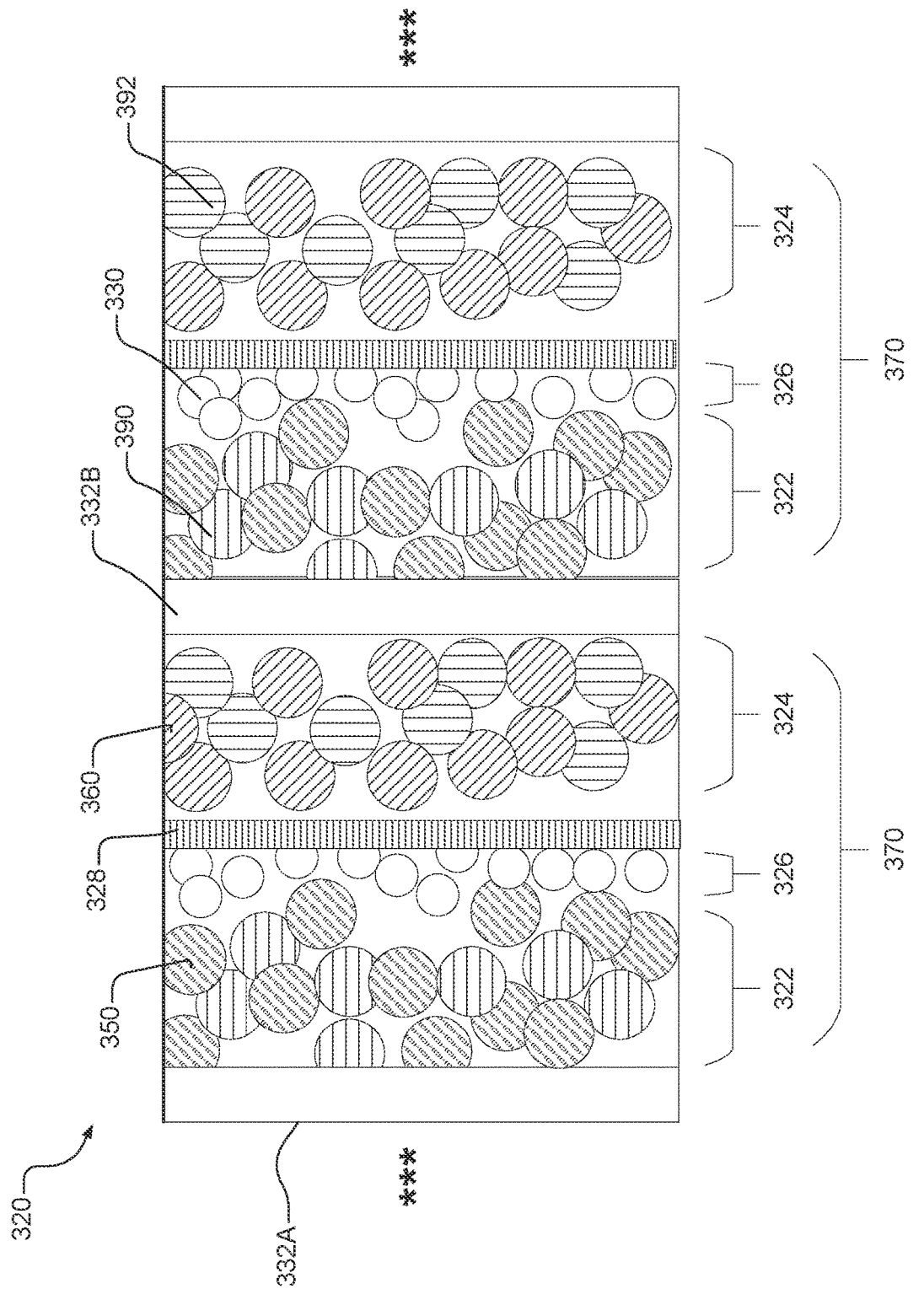
FIG. 3 is an illustration of an example solid-state battery including single cell bipolar units and one or more solid electrolyte layers disposed on or adjacent to one or more surfaces of a free-standing electrolyte membrane in accordance with various aspects of the present disclosure.

In various aspects, the polymeric gel layer may include a first plurality of solid-state electrolyte particles 30. For example, the electrolyte layer 26 may be in the form of a layer or a composite that includes the first plurality of solid-state electrolyte particles 30. The first plurality of solid-state electrolyte particles 30 may be dispersed within a polymeric matrix defined by the one or more polymers. In other variations, such as illustrated in FIG. 3, the solid-state electrolyte particles 30 may be disposed or coated on one or more surfaces of the polymeric gel layer. The solid-state electrolyte particles 30 may have an average particle diameter greater than or equal to about 0.02 µm to less than or equal to about 20 µm, and in certain aspects, optionally greater than or equal to about 0.1 µm to less than or equal to about 1 µm. The polymeric gel layer may include greater than or equal to about 0 wt. % to less than or equal to about 98 wt. %, and in certain aspects, optionally greater than or equal to about 1 wt. % to less than or equal to about 98 wt. %, of the solid-state electrolyte particles 30. The solid-state electrolyte particles 30 may comprise one or more oxide-based particles, metal-doped or aliovalent-substituted oxide particles, sulfide-based particles, nitride-based particles, hydride-based particles, halide-based particles, and borate-based particles.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where 0≤x≤2), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}SiYP_{3-y}O_{12}$ (where 0<x<2 and 0<y<3), and combinations thereof.

In certain variations, the sulfide-based particles may include, for example only, $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where 0.5≤x≤0.7), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, and combinations thereof.

In certain variations, the nitride-based particles may include, for example only, $Li_3N$, $Li_7PN_4$, $LiSi_2N_3$, and combinations thereof; the hydride-based particles may include, for example only, $LiBH_4$, $LiBH_4$—$LiX$ (where x=Cl, Br, or I), $LiNH_2$, $Li_2NH$, $LiBH_4$—$LiNH_2$, $Li_3AlH_6$, and combinations thereof; the halide-based particles may include, for example only, $LiI$, $Li_3InCl_6$, $Li_2CdCl_4$, $Li_2MgCl_4$, $LiCdI_4$, $Li_2ZnI_4$, $Li_3OCl$, and combinations thereof; and the borate-based particles may include, for example only, $Li_2B_4O_7$, $Li_2O$—$B_2O_3$—$P_2O_5$, and combinations thereof.

In various aspects, the first plurality of solid-state electrolyte particles 30 may include one or more electrolyte materials selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where 0<x<2 and 0<y<3), $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where 0.5≤x≤0.7), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, $Li_3N$, $Li_7PN_4$, $LiSi_2N_3$, $LiBH_4$, $LiBH_4$—$LiX$ (where x=Cl, Br, or I), $LiNH_2$, $Li_2NH$, $LiBH_4$—$LiNH_2$, $Li_3AlH_6$, $LiI$, $Li_3InCl_6$, $Li_2CdCl_4$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

Although not illustrated, the skilled artisan will recognize that in certain instances, one or more binder particles may be mixed with the solid-state electrolyte particles 30. For example, in certain aspects, the electrolyte layer 26 may include greater than or equal to about 0.5 wt. % to less than or equal to about 10 wt. % of the one or more binders. The one or more binders may include, for example only, polyvinylidene difluoride (PVDF), polytetrafluoroethylene (PTFE), ethylene propylene diene monomer (EPDM) rubber, nitrile butadiene rubber (NBR), styrene-butadiene rubber (SBR), polyethylene glycol (PEO), and lithium polyacrylate (LiPAA).

In certain instances, the solid-state electrolyte particles 30 (and the optionally one or more binder particles) may be wetted by a small amount of liquid electrolyte, for example, to improve ionic conduction between the solid-state electrolyte particles 30. The solid-state electrolyte particles 30 may be wetted by greater than or equal to about 0 wt. % to less than or equal to about 40 wt. %, optionally greater than or equal to about 0.1 wt. % to less than or equal to about 40 wt. %, and in certain aspects, optionally greater than or equal to about 5 wt. % to less or equal to about 10 wt. %, of the liquid electrolyte, based on the weight of the solid-state electrolyte particles 30. In certain variations, $Li_7P_3S_{11}$ may be wetted by an ionic liquid electrolyte including LiTFSI-triethylene glycol dimethyl ether.

The negative electrode 22 may be formed from a lithium host material that is capable of functioning as a negative terminal of a lithium-ion battery. For example, in certain variations, the negative electrode 22 may be defined by a plurality of the negative solid-state electroactive particles 50. In certain instances, as illustrated, the negative electrode 22 is a composite comprising a mixture of the negative solid-state electroactive particles 50 and the second plurality of solid-state electrolyte particles 90. For example, the negative electrode 22 may include greater than or equal to about 30 wt. % to less than or equal to about 98 wt. %, and in certain aspects, optionally greater than or equal to about 50 wt. % to less than or equal to about 95 wt. %, of the negative solid-state electroactive particles 50 and greater than or equal to about 0 wt. % to less than or equal to about 50 wt. %, and in certain aspects, optionally greater than or equal to about 5 wt. % to less than or equal to about 20 wt. %, of the second plurality of solid-state electrolyte particles 90.

The second plurality of solid-state electrolyte particles 90 may be the same as or different from the first plurality of solid-state electrolyte particles 30. In certain variations, the negative solid-state electroactive particles 50 may be lithium-based, for example, a lithium alloy. In other variations, the negative solid-state electroactive particles 50 may be silicon-based comprising, for example, a silicon alloy and/or silicon-graphite mixture. In still other variations, the negative electrode 22 may be a carbonaceous anode and the negative solid-state electroactive particles 50 may comprise one or more negative electroactive materials, such as graphite, graphene, hard carbon, soft carbon, and carbon nanotubes (CNTs). In still further variations, the negative electrode 22 may comprise one or more negative electroactive materials, such as lithium titanium oxide ($Li_4Ti_5O_{12}$); one or more metal oxides, such as $TiO_2$ and/or $V_2O_5$; and metal sulfides, such as FeS. Thus, the negative solid-state electroactive particles 50 may be selected from the group including, for example only, lithium, graphite, graphene, hard carbon, soft carbon, carbon nanotubes, silicon, silicon-containing alloys, tin-containing alloys, and combinations thereof.

In certain variations, the negative electrode 22 may further include one or more conductive additives and/or binder materials. For example, the negative solid-state electroactive particles 50 (and/or second plurality of solid-state electrolyte particles 90) may be optionally intermingled with one or more electrically conductive materials (not shown) that provide an electron conduction path and/or at least one polymeric binder material (not shown) that improves the structural integrity of the negative electrode 22.

For example, the negative solid-state electroactive particles 50 (and/or second plurality of solid-state electrolyte particles 90) may be optionally intermingled with binders, such as polyvinylidene difluoride (PVDF), polytetrafluoroethylene (PTFE), ethylene propylene diene monomer (EPDM) rubber, nitrile butadiene rubber (NBR), styrene-butadiene rubber (SBR), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The negative electrode 22 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

The positive electrode 24 may be formed from a lithium-based or electroactive material that can undergo lithium intercalation and deintercalation while functioning as the positive terminal of the battery 20. For example, in certain variations, the positive electrode 24 may be defined by a plurality of the positive solid-state electroactive particles 60. In certain instances, as illustrated, the positive electrode 24 is a composite comprising a mixture of the positive solid-state electroactive particles 60 and the third plurality of solid-state electrolyte particles 92. For example, the positive electrode 24 may include greater than or equal to about 30 wt. % to less than or equal to about 98 wt. %, and in certain aspects, optionally greater than or equal to about 50 wt. % to less than or equal to about 95 wt. %, of the positive solid-state electroactive particles 60 and greater than or equal to about 0 wt. % to less than or equal to about 50 wt. %, and in certain aspects, optionally greater than or equal to about 5 wt. % to less than or equal to about 20 wt. %, of the third plurality of solid-state electrolyte particles 92.

The third plurality of solid-state electrolyte particles 92 may be the same as or different from the first and/or second pluralities of solid-state electrolyte particles 30, 90. In certain variations, the positive electrode 24 may be one of a layered-oxide cathode, a spinel cathode, and a polyanion cathode. For example, in the instances of a layered-oxide cathode (e.g., rock salt layered oxides), the positive solid-state electroactive particles 60 may comprise one or more positive electroactive materials selected from $LiCoO_2$, $LiNi_{1-x-y}Mn_yCo_{1-x-y}O_2$ (where $0 \le x \le 1$ and $0 \le y \le 1$), $LiNi_xMn_yAl_{1-x-y}O_2$ (where $0 \le x \le 1$ and $0 \le y \le 1$), $LiNi_xMn_{1-x}O_2$ (where $0 \le x \le 1$), and $Li_{1+x}MO_2$ (where $0 \le x \le 1$) for solid-state lithium-ion batteries. The spinel cathode may include one or more positive electroactive materials, such as $LiMn_2O_4$ and $LiNi_{0.5}Mn_{1.5}O_4$. The polyanion cation may include, for example, a phosphate, such as $LiFePO_4$, $LiVPO_4$, $LiV_2(PO_4)_3$, $Li_2FePO_4F$, $Li_3Fe_3(PO_4)_4$, or $Li_3V_2(PO_4)F_3$ for lithium-ion batteries, and/or a silicate, such as $LiFeSiO_4$ for lithium-ion batteries. In this fashion, in various aspects, the positive solid-state electroactive particles 60 may comprise one or more positive electroactive materials selected from the group consisting of $LiCoO_2$, $LiNi_xMn_yCo_{1-x-y}O_2$ (where $0 \le x \le 1$ and $0 \le y \le 1$), $LiNi_xMn_{1-x}O_2$ (where $0 \le x \le 1$), $Li_{1+x}MO_2$ (where $0 \le x \le 1$), $LiMn_2O_4$, $LiNi_xMn_{1.5}O_4$, $LiFePO_4$, $Li_rPO_4$, $LiV_2(PO_4)_3$, $Li_2FePO_4F$, $Li_3Fe_3(PO_4)_4$, $Li_3V_2(PO_4)F_3$, $LiFeSiO_4$, and combinations thereof. In certain aspects, the positive solid-state electroactive particles 60 may be coated (for example, by $LiNbO_3$ and/or $Al_2O_3$) and/or the positive electroactive material may be doped (for example, by aluminum and/or magnesium).

In certain variations, the positive electrode 24 may further include one or more conductive additives and/or binder materials. For example, the positive solid-state electroactive particles 60 (and/or third plurality of solid-state electrolyte particles 92) may be optionally intermingled with one or more electrically conductive materials (not shown) that provide an electron conduction path and/or at least one polymeric binder material (not shown) that improves the structural integrity of the positive electrode 24.

For example, the positive solid-state electroactive particles 60 (and/or third plurality of solid-state electrolyte particles 92) may be optionally intermingled with binders, like polyvinylidene difluoride (PVDF), polytetrafluoroethylene (PTFE), ethylene propylene diene monomer (EPDM) rubber, nitrile butadiene rubber (NBR), styrene-butadiene rubber (SBR), polyethylene glycol (PEO), and/or lithium polyacrylate (LiPAA) binders. Electrically conductive materials may include, for example, carbon-based materials or a conductive polymer. Carbon-based materials may include, for example, particles of graphite, acetylene black (such as KETCHEN™ black or DENKA™ black), carbon fibers and nanotubes, graphene (such as graphene oxide), carbon black (such as Super P), and the like. Examples of a conductive polymer may include polyaniline, polythiophene, polyacetylene, polypyrrole, and the like. In certain aspects, mixtures of the conductive additives and/or binder materials may be used.

The positive electrode 24 may include greater than or equal to about 0 wt. % to less than or equal to about 30 wt. %, and in certain aspects, optionally greater than or equal to about 2 wt. % to less than or equal to about 10 wt. %, of the one or more electrically conductive additives; and greater than or equal to about 0 wt. % to less than or equal to about 20 wt. %, and in certain aspects, optionally greater than or equal to about 1 wt. % to less than or equal to about 10 wt. %, of the one or more binders.

Figure 2:
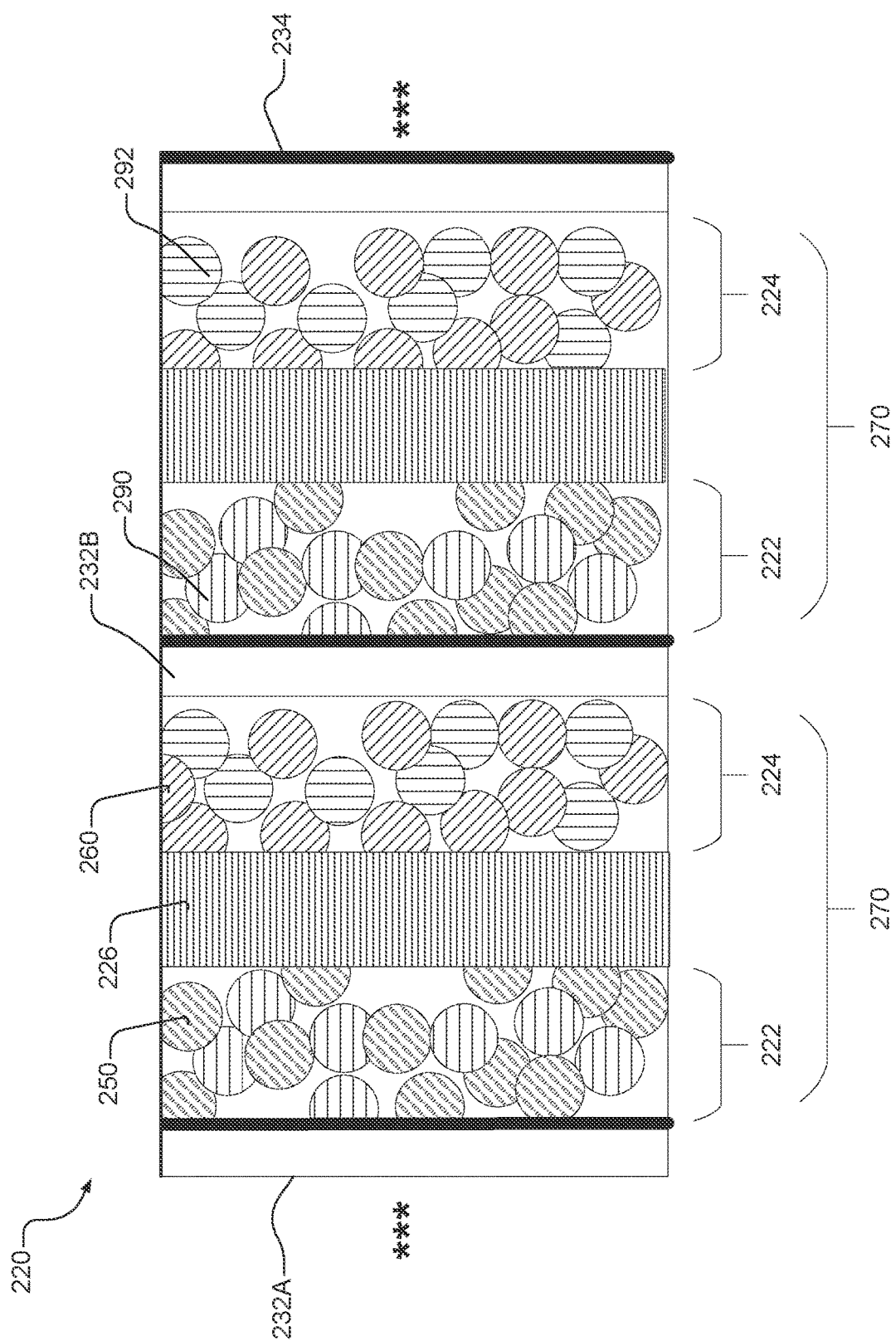
FIG. 2 is an illustration of an example solid-state battery including single cell bipolar units and one or more electrically conductive adhesive layers in accordance with various aspects of the present disclosure.

In various aspects, the present disclosure provides bipolar current collectors with electrically conductive material layers or coatings. For example, an electrically conductive adhesive layer may be formed or coated on one or more surfaces of a bipolar current collector. For example, FIG. 2 illustrates an example solid-state battery 220 including one or more electrically conductive adhesive layers 234. The one or more electrically conductive adhesive layers 234 may improve connections between the electrodes 222, 224 and the current collectors 232A, 234B.

As illustrated in FIG. 2, the solid-state battery 220 includes a plurality of single cell bipolar unit 270. The asterisks are meant to illustrate that the solid-state battery 220 may include additional or fewer single cell bipolar units 270, as would be appreciated by the skilled artisan. Each bipolar cell unit 270 includes a negative electrode 222 disposed on or adjacent to a first bipolar current collector 232A and a positive electrode 224 disposed on or adjacent to a second bipolar current collector 232B. An electrolyte layer 226 may be a separating layer disposed between the negative electrode 222 and the positive electrode 224. Similar to electrolyte layer 26, electrolyte layer 226 may be a free-standing electrolyte membrane. Although not illustrated, the skilled artisan will appreciate that in certain variations, the electrolyte layer 226 may include a first plurality of solid-state electrolyte particles. Like negative electrode 22, the negative electrode 222 may include a plurality of negative solid-state electroactive particles 250 mixed with a second plurality of solid-state electrolyte particles 290. Like positive electrode 24, the positive electrode 224 may include a plurality of positive solid-state electroactive particles 260 mixed with a third plurality of solid-state electrolyte particles 292. The third plurality of solid-state electrolyte particles may be the same or different from the second and third pluralities of solid-state electrolyte particles 290, 292. The second plurality of solid-state electrolyte particles 290 may be the same or different from the first plurality of solid-state electrolyte particles 292.

The first and second bipolar current collectors 232A, 232B may be the same or different. In certain variations, for example, depending on the composition of the negative and positive electrodes 222, 224 (such as, when the positive electrode 224 a lithium manganese oxide (LMO) cathode and the negative electrode 222 is lithium titanate (LTO) anode), the first bipolar current collector 232A and/or second bipolar current collectors 232B may be a metal foil including at least one of stainless steel, aluminum, nickel, iron, titanium, copper, tin, or any other electrically conductive material known to those of skill in the art. In other variations, the first bipolar current collector 232A and/or second bipolar current collectors 232B may be a cladded foil for example, where one side (e.g., the first side or the second side) of the current collector includes one metal (e.g., first metal) and another side (e.g., the other side of the first side or the second side) of the current collector 232 includes another metal (e.g., second metal). The cladded foil may include, for example only, aluminum-copper (Al—Cu), nickel-copper (Ni—Cu), stainless steel-copper (SS-Cu), aluminum-nickel (Al—Ni), aluminum-stainless steel (Al-SS), and nickel-stainless steel (Ni-SS). In still other variations, the first bipolar current collector 232A and/or second bipolar current collectors 232B may be pre-coated, such as carbon-coated aluminum current collectors.

An electrically conductive adhesive layer 234 may be disposed on or adjacent to one or more surfaces of each bipolar current collector 232A, 232B. For example, as illustrated, the electrically conductive adhesive layers 234 may be disposed between the bipolar current collectors 232A, 232B and the negative electrodes 222. Although not illustrated, the skilled artisan will appreciate that in certain variations the electrically conductive adhesive layers 234 may be disposed on each side of the bipolar current collectors 232A, 232B or on sides of the bipolar current collectors 232A, 232B adjacent to the positive electrodes 224 (i.e., the electrically conductive adhesive layers 234 may be disposed between the bipolar current collectors 232A, 232B and the positive electrodes 224).

In each instance, the electrically conductive adhesive layer 234 has a thickness greater than or equal to about 0.5 μm to less than or equal to about 20 μm and includes a polymer and a conductive filler. For example, the electrically conductive adhesive layer 234 may include greater than or equal to about 0.1 wt. % to less than or equal to about 50 wt. % of the polymer and greater than or equal to about 0.1 wt. % to less than or equal to about 50 wt. % of the conductive filler. The polymer may be selected to be solvent resistant and to provide good adhesion. For example, the polymer may include epoxy, polyimide (polyamic acid), polyester, vinyl ester, thermoplastic polymers (e.g., polyvinylidene difluoride (PVDF)), polyamide, silicone, acrylic, polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and any combination thereof. The conductive filler may include carbon materials (e.g., Super P, carbon black, graphene, carbon nanotubes, carbon nanofibers, and the like), metal powders (e.g., gold (Ag), nickel (Ni), aluminum (Al), and the like), and any combination thereof.

In various aspects, the present disclosure provides another example solid-state battery 320. For example, as illustrated in FIG. 3, the solid-state battery 320 may include one or more solid electrolyte layers 326 disposed on or adjacent to one or more surfaces of a free-standing electrolyte membrane 328. The combination of the solid electrolyte layer 326 and the free-standing electrolyte membrane 328 may boost ion transport and/or reduce or eliminate shorting after gel diffusion.

As illustrated in FIG. 3, the solid-state battery 320 includes a plurality of single cell bipolar units 370. The asterisks are meant to illustrate that the solid-state battery 320 may include additional or fewer single cell bipolar units 370, as would be appreciated by the skilled artisan. Each bipolar cell unit 370 includes a negative electrode 322 disposed on or adjacent to a first bipolar current collector 332A and a positive electrode 324 disposed on or adjacent to a second bipolar current collector 332B. Like negative electrode 22, the negative electrode 322 may include a plurality of negative solidstate electroactive particles 350 mixed with a first plurality of solid-state electrolyte particles 390. Like positive electrode 24, the positive electrode 324 may include a plurality of positive solidstate electroactive particles 360 mixed with a second plurality of solid state electrolyte particles 392. The second plurality of solidstate electrolyte particles 392 may be the same or different from the first plurality of solid-state electrolyte particles 390

A free-standing electrolyte membrane 328 may be a separating layer disposed between the negative electrode 322 and the positive electrode 324. In various aspects, the solid-state battery 320 may further include a solid-state electrolyte layer 326. For example, the solid-state electrolyte layer 326 may be disposed between the free-standing electrolyte membrane 328 and the negative electrode 322. Although not illustrated, the skilled artisan will appreciate that in certain variations the solid-state electrolyte layer 326 is a first solid-state electrolyte layer and the solid-state battery further includes a second solid-state electrolyte layer 326 disposed on a second side of the free-standing electrolyte membrane 328 adjacent to the positive electrode 324; and that in still further variations, the solid-state electrolyte layer 326 may be formed instead on a side of the free-standing electrolyte membrane 328 adjacent to the positive electrode 324 (i.e., disposed between the free-standing electrolyte membrane 328 and the positive electrode 324). In each instance, the solid-state electrolyte layer 326 has a thickness greater than or equal to about 0.5 μm to less than or equal to about 50 μm and includes a third plurality of solid-state electrolyte particles 330.

The third plurality of solid-state electrolyte particles 330 may be the same or different from the first and second pluralities of solid-state electrolyte particles 390, 392. The third plurality of solid-state electrolyte particles 330 (and/or the first and second pluralities of solid-state electrolyte particles 390, 392) may comprise one or more oxide-based particles, metal-doped or aliovalent-substituted oxide particles, sulfide-based particles, nitride-based particles, hydride-based particles, halide-based particles, and borate-based particles.

In certain variations, the oxide-based particles may comprise one or more garnet ceramics, LISICON-type oxides, NASICON-type oxides, and Perovskite type ceramics. For example, the garnet ceramics may be selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, and combinations thereof. The LISICON-type oxides may be selected from the group consisting of: $Li_{2+2x}Zn_{1-x}GeO_4$ (where $0<x<1$), $Li_{14}Zn(GeO_4)_4$, $Li_{3+x}(P_{1-x}Si_x)O_4$ (where $0<x<1$), $Li_{3+x}Ge_xV_{1-x}O_4$ (where $0<x<1$), and combinations thereof. The NASICON-type oxides may be defined by $LiMM'(PO_4)_3$, where M and M' are independently selected from Al, Ge, Ti, Sn, Hf, Zr, and La. For example, in certain variations, the NASICON-type oxides may be selected from the group consisting of: $Li_{1+x}Al_xGe_{2-x}(PO_4)_3$ (LAGP) (where $0 \leq x \leq 2$), $Li_{1.4}Al_{0.4}Ti_{1.6}(PO_4)_3$, $Li_{1.3}Al_{0.3}Ti_{1.7}(PO_4)_3$, $LiTi_2(PO_4)_3$, $LiGeTi(PO_4)_3$, $LiGe_2(PO_4)_3$, $LiHf_2(PO_4)_3$, and combinations thereof. The Perovskite-type ceramics may be selected from the group consisting of: $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where $x=0.75y$ and $0.60<y<0.75$), $Li_{3/8}Sr_{7/6}Nb_{3/4}Zr_{1/4}O_3$, $Li_{3x}La_{(2/3-x)}TiO_3$ (where $0<x<0.25$), and combinations thereof.

In certain variations, the metal-doped or aliovalent-substituted oxide particles may include, for example only, aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where $0<x<2$ and $0<y<3$), and combinations thereof.

In certain variations, the sulfide-based particles may include, for example only, $Li_2S$—$P_2S_5$ system, $Li_2S$—$P_2S_5$-$MO_x$ system (where $1<x<7$), $Li_2S$—$P_2S_5$-$MS_x$ system (where $1<x<7$), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where $0.5 \leq x \leq 0.7$), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.19}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, $LiI$—$Li_4SnS_4$, $Li_4SnS_4$, and combinations thereof.

In certain variations, the nitride-based particles may include, for example only, $Li_3N$, $Li_7PN_4$, $LiSi_2N_3$, and combinations thereof; the hydride-based particles may include, for example only, $LiBH_4$, $LiBH_4$—$LiX$ (where x=Cl, Br, or I), $LiNH_2$, $Li_2NH$, $LiBH_4$—$LiNH_2$, $Li_3AlH_6$, and combinations thereof; the halide-based particles may include, for example only, $LiI$, $Li_3InCl_6$, $Li_2CdCl_4$, $Li_2MgCl_4$, $LiCdI_4$, $Li_2ZnI_4$, $Li_3OCl$, and combinations thereof; and the borate-based particles may include, for example only, $Li_2B_4O_7$, $Li_2O$—$B_2O_3$—$P_2O_5$, and combinations thereof.

In various aspects, the first plurality of solid-state electrolyte particles 30 may include one or more electrolyte materials selected from the group consisting of: $Li_7La_3Zr_2O_{12}$, $Li_{6.2}Ga_{0.3}La_{2.95}Rb_{0.05}Zr_2O_{12}$, $Li_{6.85}La_{2.9}Ca_{0.1}Zr_{1.75}Nb_{0.25}O_{12}$, $Li_{6.25}Al_{0.25}La_3Zr_2O_{12}$, $Li_{6.75}La_3Zr_{1.75}Nb_{0.25}O_{12}$, $Li_{6.75}La_3Zr_{1.75}Nb_{0.25}O_{12}$, $Li_{2+2x}Zn_{1-x}GeO_4$ (where 0<x<1), $Li_{14}Zn(GeO_4)_4$, $Li_{3+x}(P_{1-x}Si_x)O_4$ (where 0<x<1), $Li_{3+x}Ge_xV_{1-x}O_4$ (where 0<x<1), $LiMM'(PO_4)_3$ (where M and M' are independently selected from Al, Ge, Ti, Sn, Hf, Zr, and La), $Li_{3.3}La_{0.53}TiO_3$, $LiSr_{1.65}Zr_{1.3}Ta_{1.7}O_9$, $Li_{2x-y}Sr_{1-x}Ta_yZr_{1-y}O_3$ (where x=0.75y and 0.60<y<0.75), $Li_{3/8}Sr_{7/16}Nb_{3/4}Zr_{1/4}O_3$, $Li_{3x}La_{(2/3-x)}TiO_3$ (where 0<x<0.25), aluminum (Al) or niobium (Nb) doped $Li_7La_3Zr_2O_{12}$, antimony (Sb) doped $Li_7La_3Zr_2O_{12}$, gallium (Ga) doped $Li_7La_3Zr_2O_{12}$, chromium (Cr) and/or vanadium (V) substituted $LiSn_2P_3O_{12}$, aluminum (Al) substituted $Li_{1+x+y}Al_xTi_{2-x}Si_yP_{3-y}O_{12}$ (where 0<x<2 and 0<y<3), $Li_2S$—$P_2S_5$ system, $Li_2S$—$P_2S_5$-$MO_x$ system (where 1<x<7), $Li_2S$—$P_2S_5$-$MS_x$ system (where 1<x<7), $Li_{10}GeP_2S_{12}$ (LGPS), $Li_6PS_5X$ (where X is Cl, Br, or I) (lithium argyrodite), $Li_7P_2S_8I$, $Li_{10.35}Ge_{1.35}P_{1.65}S_{12}$, $Li_{3.25}Ge_{0.25}P_{0.75}S_4$ (thio-LISICON), $Li_{10}SnP_2S_{12}$, $Li_{10}SiP_2S_{12}$, $Li_{9.54}Si_{1.74}P_{1.44}S_{11.7}Cl_{0.3}$, $(1-x)P_2S_5$-$xLi_2S$ (where 0.5≤x≤0.7), $Li_{3.4}Si_{0.4}P_{0.6}S_4$, $PLi_{10}GeP_2S_{11.7}O_{0.3}$, $Li_{9.6}P_3S_{12}$, $Li_7P_3S_{11}$, $Li_9P_3S_9O_3$, $Li_{10.35}Ge_{1.35}P_{1.63}S_{12}$, $Li_{9.81}Sn_{0.81}P_{2.9}S_{12}$, $Li_{10}(Si_{0.5}Ge_{0.5})P_2S_{12}$, $Li_{10}(Ge_{0.5}Sn_{0.5})P_2S_{12}$, $Li_{10}(Si_{0.5}Sn_{0.5})P_2S_{12}$, $Li_{3.833}Sn_{0.833}As_{0.16}S_4$, LiI—$Li_4SnS_4$, $Li_4SnS_4$, $Li_3N$, $Li_7PN_4$, $LiSi_2N_3$, $LiBH_4$, $LiBH_4$—LiX (where x=Cl, Br, or I), $LiNH_2$, $Li_2NH$, $LiBH_4$—$LiNH_2$, $Li_3AlH_6$, LiI, $Li_3InCl_6$, $Li_2CdCl_4$, $Li_2MgCl_4$, $LiCdI_4$, $Li_2ZnI_4$, $Li_3OCl$, $Li_2B_4O_7$, $Li_2O$—$B_2O_3$—$P_2O_5$, and combinations thereof.

Figure 4A:
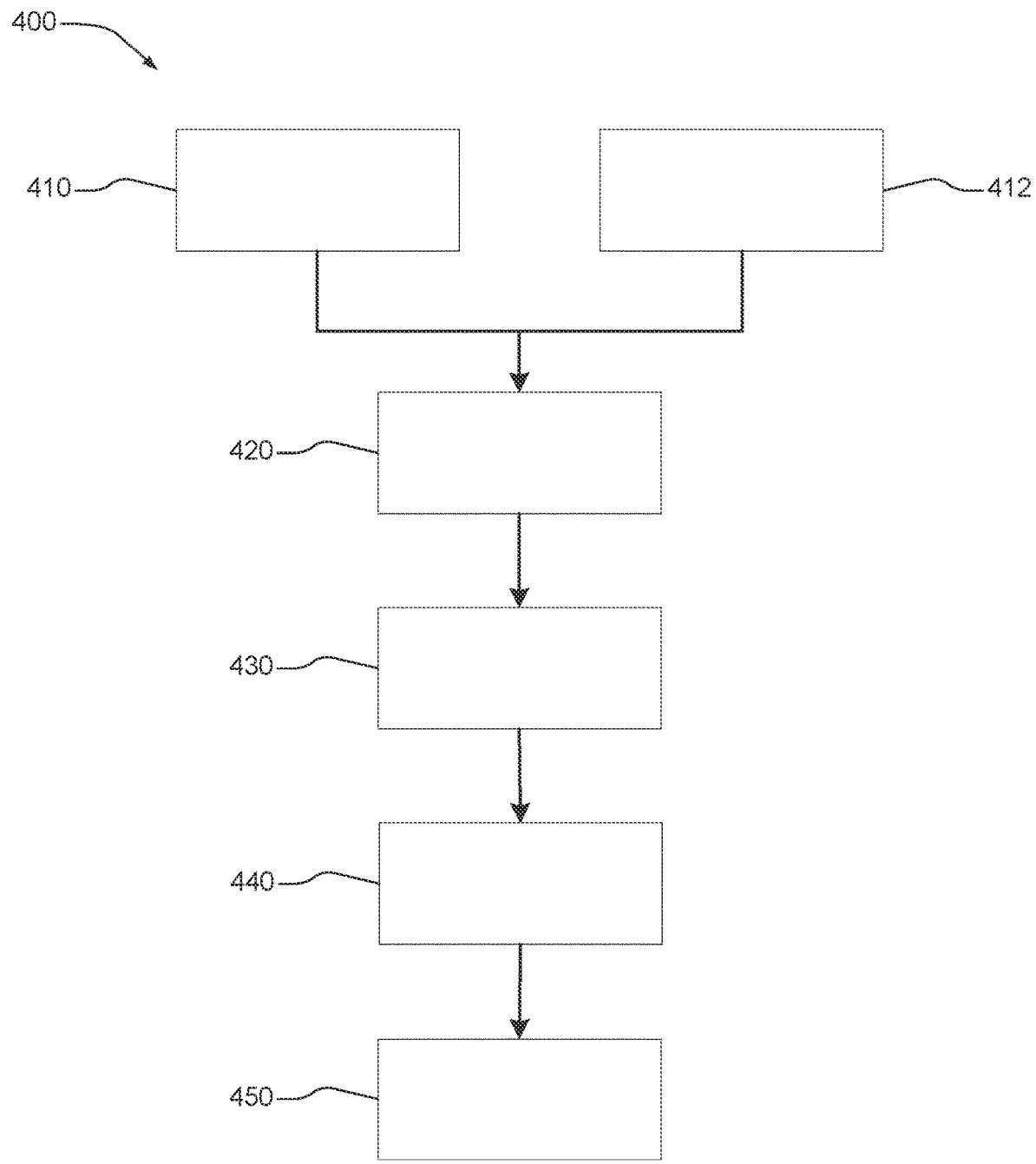
FIG. 4A is an illustration of an example method for forming a solid-state battery, like the solid-state batteries illustrated in FIGS. 1-3, using a transfer film process in accordance with various aspects of the present disclosure.
Figure 4B:
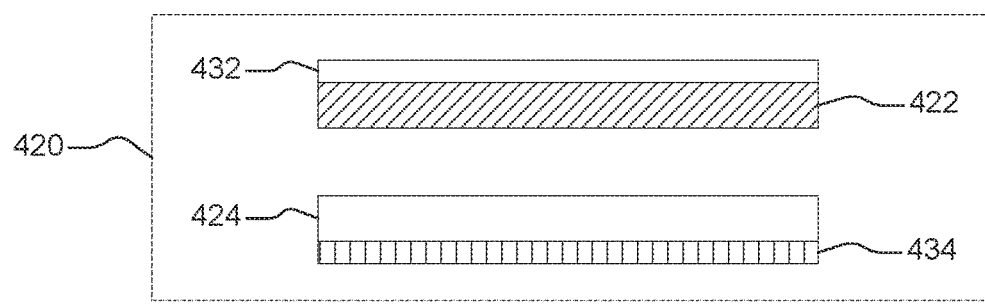
FIG. 4B is another illustration of the example method for forming a solid-state battery illustrated in FIG. 4A.
Figure 4B:
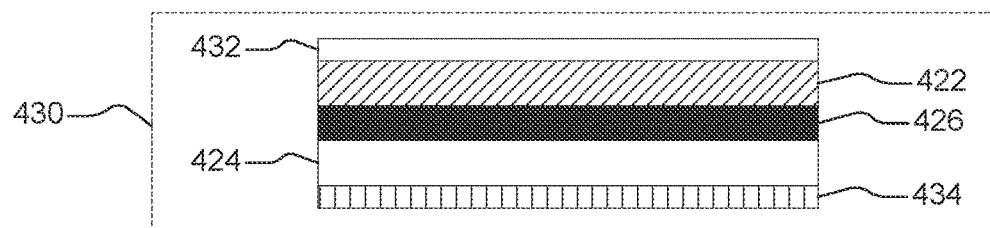
Figure 4B:
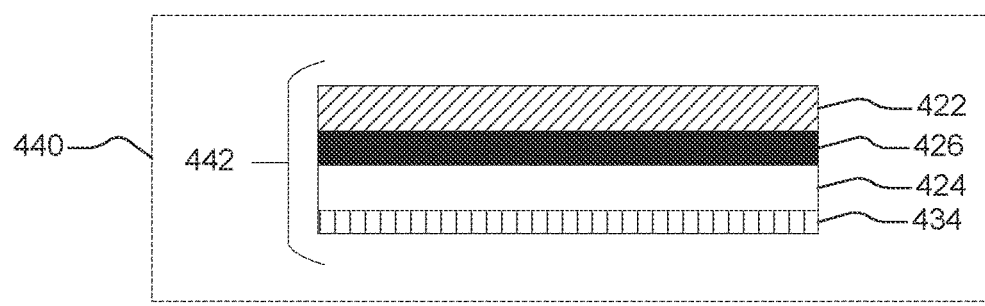
Figure 4B:
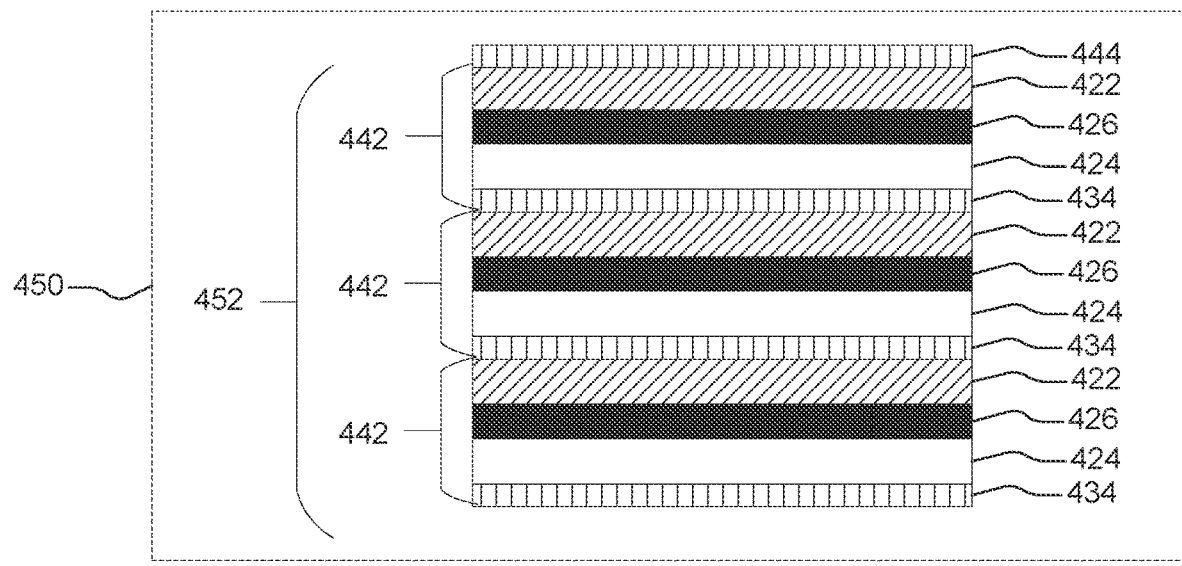

In various aspects, the present disclosure provides methods for fabricating solid-state batteries, like the solid-state battery 20 illustrated in FIG. 1, solid-state battery 220 illustrated in FIG. 2, and/or solid-state battery 320 illustrated in FIG. 3. For example, FIGS. 4A and 4B illustrate an example method 400 for preparing a solid-state battery. The method 400 may be a transfer printing process. For example, the method 400 may include aligning 420 a first electrode 422 and a second electrode 424. Aligning 420 the first electrode 422 and the second electrode 424 may be substantial alignment, where any misalignment between corresponding edges of the first and second electrodes 422, 424 is within a normal range for a high throughput manufacturing process, for example, less than or equal to about 0.5 mm, optionally less than or equal to about 0.1 mm, and in certain aspects, optionally less than or equal to about 0.05 mm.

The first electrode 422 may be disposed on an exposed surface of a releasable substrate 432. The second electrode 424 may be disposed on an exposed surface of a current collector 434. In certain variations, as illustrated, the first electrode 422 may be a negative electrode, and the second electrode 424 may be a positive electrode. Although not illustrated, the skilled artisan would understand that in other variations, the first electrode 422 may be a positive electrode, and the second electrode 424 may be a negative electrode.

The releasable substrate 432 may be a polymeric thin film having a thickness greater than or equal to about 2 μm to less than or equal to about 1,000 μm, where an adhesive strength between the first electrode 422 (i.e., transfer layer) and the releasable substrate 432 is less than the adhesive strength between the first electrode 422 and a free-standing electrolyte membrane 426. The polymeric thin film includes one or more polymers. The one or more polymers may be selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof. In certain variations, the polymeric thin film may further include one or more fillers. For example, the polymeric thin film may include greater than or equal to about 0 wt. % to less than or equal to about 50 wt. % of one or more fillers. The one or more fillers include aluminum oxide ($Al_2O_3$), silicon dioxide ($SiO_2$), magnesium oxide (MgO), carbon, or any combination thereof. In other variations, the releasable substrate 432 may be a metal foil comprising, for example, copper, aluminum, titanium, stainless steel, cladded foil (including, for example, copper and aluminum), iron, or any combination thereof.

Like the negative electrode 22, the first electrode 422 may include a first plurality of solid-state electroactive particles and optionally a first plurality of solid-state electrolyte particles. The first electrode 422 may also include one or more binders having low adhesive strength when used with the releasable substrate 432. In various aspects, the method 400 includes preparing 410 the first electrode 422. In certain variations, the first electrode 422 may be prepared 410 using common manufacturing processes for lithium ion batteries including for example only, a coating method like slot die coating, doctor blade coating, and/or spray coating or a volatilization and pressing method.

The second electrode 424 may be a positive electrode, and like positive electrode 24, the second electrode 424 may include a second plurality of solid-state electroactive particles and optionally a second plurality of solid-state electrolyte particles. In certain variations, the method 400 includes preparing 412 the second electrode 424. The second electrode 424 may be prepared 412 using common manufacturing processes for lithium ion batteries. For example, in various aspects, the second electrode 424 may be prepared 412 by disposing the plurality of positive solid-state electroactive particles and optionally the second plurality of solid-state electrolyte particles on an exposed surface of the current collector 434 to form a coating. Although not illustrated, in certain variations, the second electrode 424 may be prepared 412 by disposing an electrically conductive material on an exposed surface of the current collector 434 to form an electrically conductive adhesive layer or coating and disposing the plurality of positive solid-state electroactive particles and optionally the second plurality of solid-state electrolyte particles on an exposed surface of the electrically conductive adhesive layer so as to form a coating. In each instance, preparing 412 the second electrode 424 may further include drying the coating and/or pressing the coating to form the second electrode 424. Although the preparing 410 of the first electrode 422 and the preparing 412 of the second electrode 424 are illustrated as occurring simultaneously, the skilled artisan will appreciate that the preparing 410 of the first electrode 422 may occur prior to or subsequent to the preparing 412 of the second electrode 424.

The method 400 may include disposing 430 a free-standing electrolyte membrane 426 between the first and second electrodes 422, 424. As illustrated in FIG. 4B, disposing 430 the free-standing electrolyte membrane 426 between the first and second electrodes 422, 424 may include contacting the first electrode 422 and a first side of the free-standing electrolyte membrane 426 and contacting the second electrode 424 and a second side of the freestanding electrolyte membrane 426, where the second side of the free-standing electrolyte membrane 426 is parallel with the first side of the free-standing electrolyte membrane 426. Although not illustrated, the skilled artisan will appreciate that, in certain variations, one or more solid-state electrolyte layers, including a plurality of solid-state electrolyte particles, such as illustrated in FIG. 3, may also be disposed between the first electrode 422 and the free-standing electrolyte membrane 426 and/or the second electrode 424 and the free-standing electrolyte membrane 426.

In each instance, the free-standing electrolyte membrane 426 may be a polymeric gel layer having a thickness greater than or equal to about 1 µm to less than or equal to about 200 µm and a tensile strength greater than or equal to about 0.1 MPa. The polymeric gel layer may include one or more polymers. The one or more polymers may be selected from the group consisting of: poly(acrylonitrile) (PAN), poly (ethylene oxide) (PEO)/(poly(ethylene glycol)) (PEG), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

In certain variations, the polymeric gel layer may also include one or more lithium salts. For example, the one or more lithium salts may be dispersed within a polymeric matrix defined by the one or more polymers. The one or more lithium salts may be selected from the group consisting of: lithium bis(trifluoromethylsulfonyl)imide (LiTFSI), lithium tetrafluoroborate (LiBF$_4$), lithium bis(oxalate)borate (LiBOB), lithium difluoro(oxalato) borate (LiODFB), lithium difluorophosphate (LiPO$_2$F$_2$), lithium fluoride (LiF), and combinations thereof. The polymeric gel layer may include greater than or equal to about 1 wt. % to less than or equal to about 90 wt. % of the one or more polymers, and greater than or equal to about 0 wt. % to less than or equal to about 70 wt. %, and in certain aspects, optionally greater than or equal to about 5 wt. % to less than or equal to about 70 wt. %, of the one or more lithium salts.

In certain variations, the polymeric gel layer may also include one or more plasticizers. For example, the one or more plasticizers may be dispersed within a polymeric matrix defined by the one or more polymers. The one or more plasticizers may be selected from dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols (such as isopropyl alcohol and butanol), or any combination thereof. The polymeric gel layer may include greater than or equal to about 0 wt. % to less than or equal to about 80 wt. % of the one or more plasticizers.

In certain variations, the polymeric gel layer may also include a third plurality of solid-state electrolyte particles. The polymeric gel layer may include greater than or equal to about 0 wt. % to less than or equal to about 98 wt. %, and in certain aspects, optionally greater than or equal to about 1 wt. % to less than or equal to about 98 wt. %, of the solid-state electrolyte particles. The solid-state electrolyte particles of the polymeric gel layer may comprise one or more oxide-based particles, metal-doped or aliovalent-substituted oxide particles, sulfide-based particles, nitride-based particles, hydride-based particles, halide-based particles, and borate-based particles. The third plurality of solid-state electrolyte particles may be the same or different from the first plurality of solid-state electrolyte particles and/or the second plurality of solid-state electrolyte particles.

With renewed reference to FIGS. 4A and 4B, the method 400 may include removing 440 the releasable substrate 432 from the first electrode 422. In certain variations, as illustrated in FIG. 4B, the releasable substrate 432 may be removed after the free-standing electrolyte membrane 426 is disposed between the first and second electrodes 422, 424. Although not illustrated, the skilled artisan will appreciate that in various variations, the releasable substrate 432 may be removed prior to disposing 430 the free-standing electrolyte membrane 426 between the first and second electrodes 422, 424. In each instance, heat and/or pressure may be applied during the removing 440 step so as to easy release of the transfer layer (i.e., first electrode 422).

The first and second electrodes 422, 424 together with the current collector 434 and the free-standing electrolyte membrane 426 may define a single cell bipolar unit 442. The method 400 may include preparing a predetermined number of single cell bipolar units 442 using the above described method steps (i.e., 420, 430, 440) and stacking 450 the single cell bipolar cell units 442 and a terminal current collector 444 to form a bipolar battery stack 452, as illustrated in FIG. 4B. Although not illustrated, in certain variations, prior to stacking 450, the method 400 may include disposing an electrically conductive material on an exposed surface of the first electrode 422 so as to form an electrically conductive adhesive layer or coating between the first electrodes 422 and the current collectors 434, and also between the first electrode 422 and the terminal current collector 444.

Figure 5:
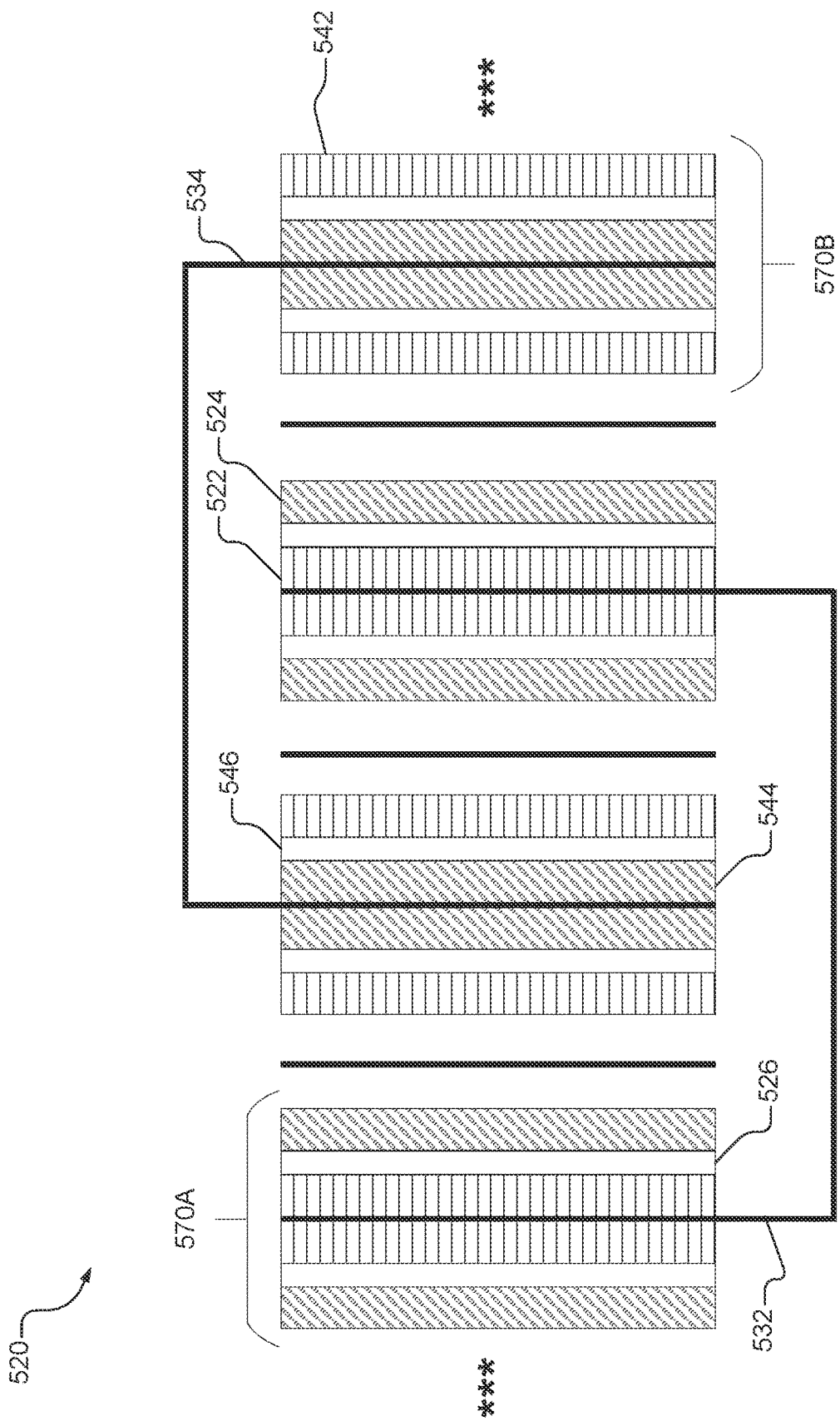
FIG. 5 is an illustration of an example solid-state battery including bi-cell bipolar units in accordance with various aspects of the present disclosure.

In various aspects, the present disclosure provides solid-state batteries having a bi-cell bipolar unit design. For example, FIG. 5 illustrates an example solid-state battery including a plurality of bi-cell bipolar units 570A, 570B. The asterisks are meant to illustrate that the solid-state battery 520 may include additional or fewer bi-cell bipolar units 570A, 570B, as would be appreciated by the skilled artisan. The plurality of bi-cell bipolar units 570A, 520B includes one or more first bi-cell bipolar units 570A and one or more second bi-cell bipolar units 570B. The first and second bipolar units 570A, 570B may be disposed in an alternating pattern, where current collectors 532 of the first bi-cell bipolar units 570A are in electrical communication and current collectors 534 of the second bi-cell bipolar units 570B are in electrical communication, so as to form the battery 520.

Each of the one or more first bi-cell bipolar units 570A includes first electrodes 522 disposed on or adjacent to parallel sides of a current collector 532. The first electrodes 522 may be negative electrodes similar to the negative electrode 22 illustrated in FIG. 1. Although not illustrated, the first electrodes 522 may include a first plurality of solid-state electroactive particles and optionally a first plurality of solid-state electrolyte particles. The first plurality of solid-state electroactive particles may comprise negative solid-state electroactive particles.

Second electrodes 524 may be disposed parallel with each of the first electrodes 522. The second electrodes 524 may be positive electrodes similar to the positive electrode 24 illustrated in FIG. 1. Though not illustrated, the second electrodes 524 may include a second plurality of solid-state electroactive particles and optionally a second plurality of solid-state electrolyte particles. The second plurality of solid-state electroactive particles may comprise positive solid-state electroactive particles. The first and second pluralities of solid-state electrolyte particles may be the same or different.

Electrolyte layers 526 may be separating layers disposed between the first electrodes 522 and the second electrode 524. Similar to electrolyte layer 26, electrolyte layer 526 may be a free-standing electrolyte membrane. Although not illustrated, the skilled artisan will appreciate that in certain variations, the electrolyte layer 526 may include a fourth plurality of solid-state electrolyte particles. For example, the fourth plurality of solid-state electrolyte particles may be disposed as a coating or layer on one or more sides of the electrolyte layer 526, such as illustrated in FIG. 3. The fourth plurality of solid-state electrolyte particles may be the same or different from the first plurality of solid-state electrolyte particles, the second plurality of solid-state electrolyte particles, and/or the third plurality of solid-state electrolyte particles. Similarly, the skilled artisan will appreciate that an electrically conductive adhesive layer may be disposed as a coating or layer on one or more sides of the first current collector 532.

Each of the one or more second bi-cell bipolar units 570B includes first electrodes 544 disposed one or adjacent to parallel sides of a second current collector 534. The first electrodes 544 may be positive electrodes similar to the positive electrode 24 illustrated in FIG. 1. Although not illustrated, the first electrode 544 may include a first plurality of solid-state electroactive particles and optionally a first plurality of solid-state electrolyte particles. The first plurality of solid-state electroactive particles may comprise positive solid-state electroactive particles. The first electrodes 544 may be the same as or different from the second electrodes 524.

Second electrodes 542 may be disposed parallel with each of the first electrodes 544. The second electrodes 542 may be negative electrodes similar to the negative electrodes 22 illustrated in FIG. 1. Though not illustrated, the second electrodes 542 may include a second plurality of solid-state electroactive particles and optionally a second plurality of solid-state electrolyte particles. The second plurality of solid-state electroactive particles may comprise negative solid-state electroactive particles. The first and second pluralities of solid-state electrolyte particles may be the same or different.

Electrolyte layers 546 may be separating layers disposed between the first electrodes 544 and the second electrode 542. Similar to electrolyte layer 26, electrolyte layer 546 may be a free-standing electrolyte membrane. Although not illustrated, the skilled artisan will appreciate that in certain variations, the electrolyte layer 546 may include a fourth plurality of solid-state electrolyte particles. For example, the fourth plurality of solid-state electrolyte particles may be disposed as a coating or layer on one or more sides of the electrolyte layer 526, such as illustrated in FIG. 3. The fourth plurality of solid-state electrolyte particles may be the same or different from the first plurality of solid-state electrolyte particles, the second plurality of solid-state electrolyte particles, and/or the third plurality of solid-state electrolyte particles. Similarly, the skilled artisan will appreciate that an electrically conductive adhesive layer may be disposed as a coating or layer on one or more sides of the second current collector 534. The second current collector 534 may be same as or different from the first current collector 532.

Figure 6A:
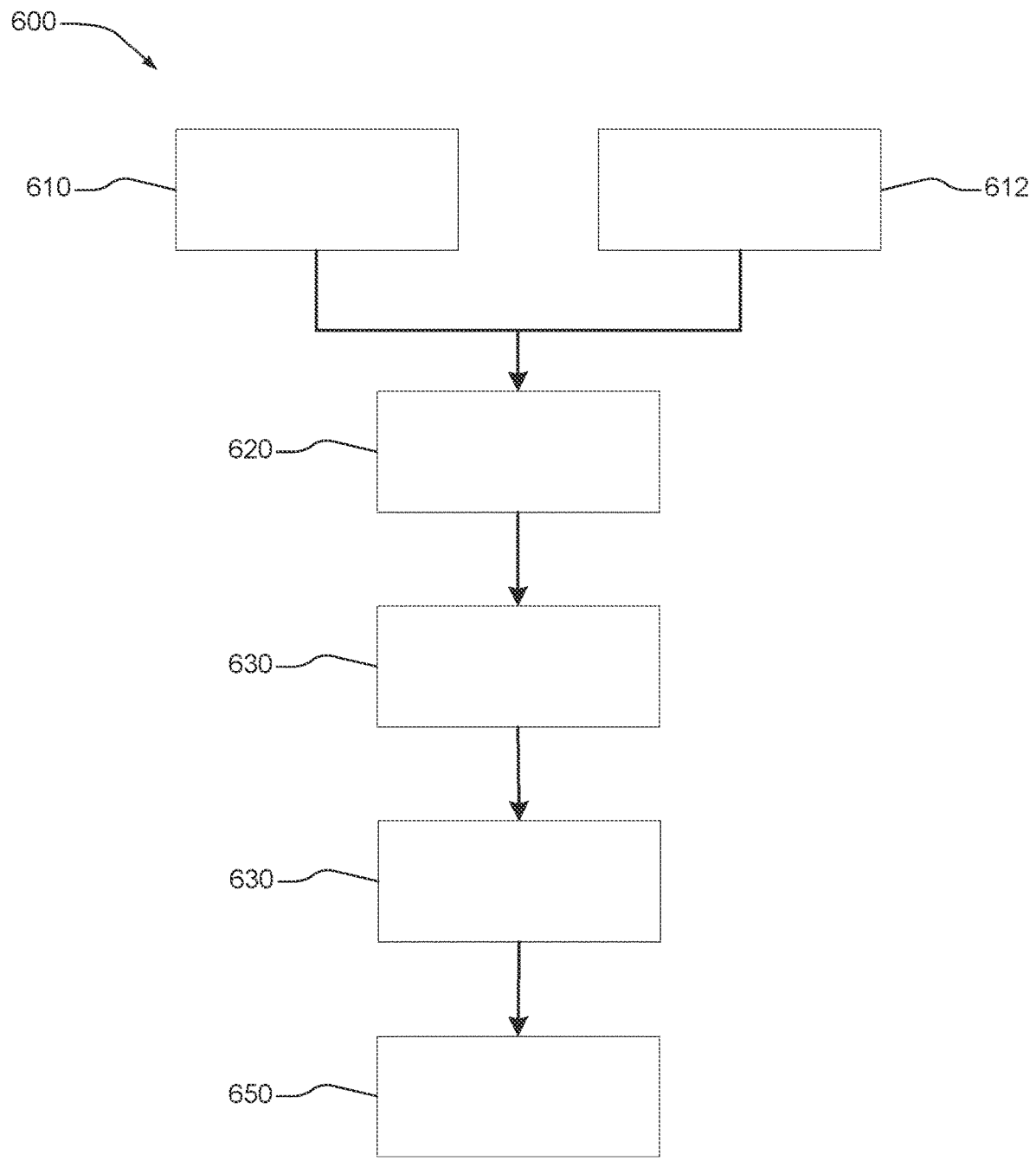
FIG. 6A is an illustration of an example method for forming a solid-state battery, like the solid-state battery illustrated in FIG. 5, using a transfer film process in accordance with various aspects of the present disclosure.
Figure 6B:
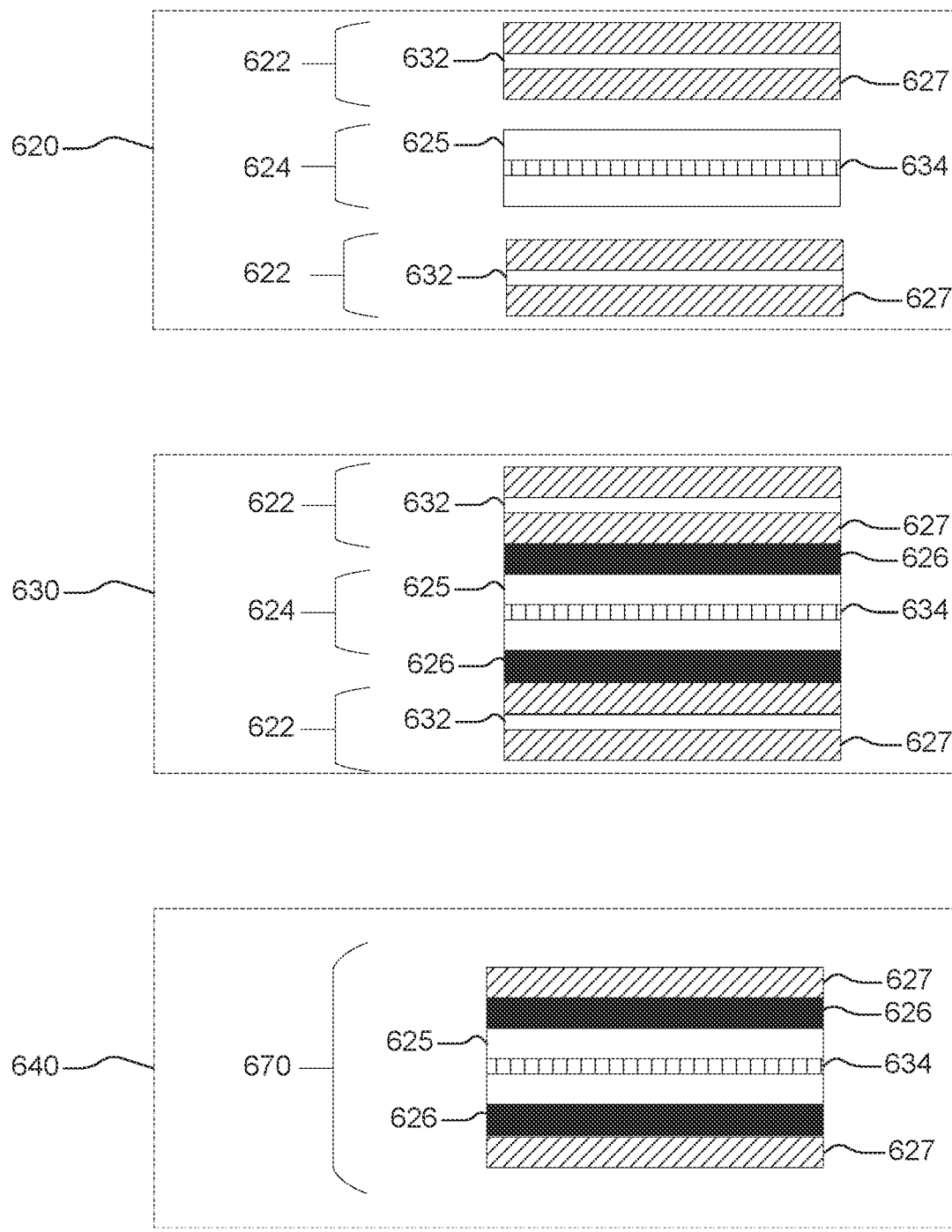
FIG. 6B is another illustration of the example method for forming a solid-state battery illustrated in FIG. 6A.

In various aspects, the present disclosure provides methods for fabricating solid-state batteries, like the solid-state battery 520 illustrated in FIG. 5. For example, FIGS. 6A and 6B illustrate an example method 600 for preparing a solid-state battery. The method 600 may be a transfer printing process, including for example, substantially aligning 620 a first electrode 624 and one or more second electrodes 622. In certain variations, as illustrated, the first electrode 624 may be a positive electrode including one or more electroactive material layers 625 disposed on one or more sides of a current collector 634. Although not illustrated, in certain variations, an electrically conductive material may be disposed between at least one of the one or more electroactive material layers 625 and the one or more sides of the current collector 634, similar to battery 220 illustrated in FIG. 2. Each of the one or more electroactive material layers 625 may include a first plurality of solid-state electroactive material particles and optionally a first plurality of solid-state electrolyte particles.

In various aspects, the method 600 includes preparing 612 the first electrode 624. In certain variations, the first electrode 624 may be prepared 612 using common manufacturing processes for lithium ion batteries. For example, in various aspects, the first electrode 624 may be prepared 612 by disposing the plurality of positive solid-state electroactive particles and optionally the second plurality of solid-state electrolyte particles on an exposed surface of the current collector 634 to form a coating. Although not illustrated, in certain variations, the second electrode 624 may be prepared 612 by disposing an electrically conductive material on an exposed surface of the current collector 634 to form an electrically conductive adhesive layer or coating and disposing the plurality of positive solid-state electroactive particles and optionally the second plurality of solid-state electrolyte particles on an exposed surface of the electrically conductive adhesive layer so as to form a coating. In each instance, preparing 612 the first electrode 624 may further include drying the coating and/or pressing the coating to form the first electrode 624.

The one or more second electrodes 622 may be negative electrodes including one or more electroactive material layers 627 disposed on one or more surfaces of a releasable substrate 632. Each of the one or more electroactive material layers 627 may include a second plurality of solid-state electroactive material particles and optionally a second plurality of solid-state electrolyte particles. The second plurality of solid-state electrolyte particles may be the same or different from the first plurality of solid-state electrolyte particles. Although an electroactive material layer 627 is illustrated as disposed on two sides of the releasable substrate 632, the skilled artisan will appreciate that in certain variations an electroactive material layer 627 may be disposed on only one side of the releasable substrate 632. Further, although not illustrated, the skilled artisan would understand that in other variations, the first electrode 624 may be a negative electrode, and the second electrode 622 may be a positive electrode.

In various aspects, the method 600 includes preparing 610 the one or more second electrodes 622. In certain variations, preparing 610 the second electrode 622 may include disposing the second plurality of solid-state electroactive material particles and optionally the second plurality of solid-state electrolyte particles on the one or more surfaces of the releasable substrate 632. For example, disposing the second plurality of solid-state electroactive material particles and optionally the second plurality of solid-state electrolyte particles on a first side and second side of the releasable substrate 632, where the second side is parallel with the first side. Although the preparing 610 of the one or more second electrodes 622 and the preparing 612 of the first electrode 624 are illustrated as occurring simultaneously, the skilled artisan will appreciate that the preparing 610 of the one or more second electrodes 622 may occur prior to or subsequent to the preparing 612 of the first electrode 624. The releasable substrate 632 may be a polymeric thin film having a thickness greater than or equal to about 2 μm to less than or equal to about 1,000 μm, where an adhesive strength between the second electrode 622 (i.e., transfer layer) and the releasable substrate 632 is less than the adhesive strength between the second electrode 622 and a free-standing electrolyte membrane 626. The polymeric thin film includes one or more polymers. The one or more polymers may be selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof. In certain variations, the polymeric thin film may further include one or more fillers. For example, the polymeric thin film may include greater than or equal to about 0 wt. % to less than or equal to about 50 wt. % of the one or more fillers. The one or more fillers include aluminum oxide ($Al_2O_3$), silicon dioxide ($SiO_2$), magnesium oxide (MgO), carbon, or any combination thereof. In other variations, the releasable substrate 632 may be a metal foil comprising, for example, copper, aluminum, titanium, iron, and combinations thereof.

With renewed reference to FIGS. 6A and 6B, the method 600 may further include disposing 630 free-standing electrolyte membranes 626 between the first electrode 624 and each of the one or more second electrodes 622. As illustrated in FIG. 6B, disposing 630 the free-standing electrolyte membranes 626 between the first electrode 624 and each of the one or more second electrodes 622 includes contacting a first electrode of the one or more second electrodes 622 and a first side of a first free-standing electrolyte membrane 626; contacting a second side of the first free-standing electrolyte membrane 626 with the first electrode 624; contacting an exposed surface of the first electrode 624 with a first side of a second free-standing electrolyte membrane 626; and contacting a second side of the second free-standing electrolyte membrane 626 with the second electrode of the one or more second electrodes 622. Although not illustrated, the skilled artisan will appreciate that, in certain variations, one or more solid-state electrolyte layers, including a plurality of solid-state electrolyte particles, such as illustrated in FIG. 3, may also be disposed between the first electrode 624 and the free-standing electrolyte membranes 626 and/or the second electrode 622 and the free-standing electrolyte membranes 626.

In each instance, the free-standing electrolyte membrane 626 may be a polymeric gel layer having a thickness greater than or equal to about 1 μm to less than or equal to about 200 μm and a tensile strength greater than or equal to about 0.1 MPa. The polymeric gel layer may include one or more polymers. The one or more polymers may be selected from the group consisting of: poly(acrylonitrile) (PAN), poly(ethylene oxide) (PEO)/(poly(ethylene glycol)) (PEG), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

In certain variations, the polymeric gel layer may also include one or more lithium salts. For example, the one or more lithium salts may be dispersed within a polymeric matrix defined by the one or more polymers. The one or more lithium salts may be selected from the group consisting of: lithium bis(trifluoromethylsulfonyl)imide (LiTFSI), lithium tetrafluoroborate ($LiBF_4$), lithium bis(oxalate)borate (LiBOB), lithium difluoro(oxalato) borate (LiODFB), lithium difluorophosphate ($LiPO_2F_2$), lithium fluoride (LiF), and combinations thereof. The polymeric gel layer may include greater than or equal to about 1 wt. % to less than or equal to about 90 wt. % of the one or more polymers, and greater than or equal to about 0 wt. % to less than or equal to about 70 wt. %, and in certain aspects, optionally greater than or equal to about 5 wt. % to less than or equal to about 70 wt. %, of the one or more lithium salts.

In certain variations, the polymeric gel layer may also include one or more plasticizers. For example, the one or more plasticizers may be dispersed within a polymeric matrix defined by the one or more polymers. The one or more plasticizers may be selected from dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols (such as isopropyl alcohol and butanol), or any combination thereof. The polymeric gel layer may include greater than or equal to about 0 wt. % to less than or equal to about 80 wt. % of the one or more plasticizers.

In certain variations, the polymeric gel layer may also include a third plurality of solid-state electrolyte particles. The polymeric gel layer may include greater than or equal to about 0 wt. % to less than or equal to about 98 wt. %, and in certain aspects, optionally greater than or equal to about 1 wt. % to less than or equal to about 98 wt. %, of the solid-state electrolyte particles. The solid-state electrolyte particles of the polymeric gel layer may comprise one or more oxide-based particles, metal-doped or aliovalent-substituted oxide particles, sulfide-based particles, nitride-based particles, hydride-based particles, halide-based particles, and borate-based particles. The third plurality of solid-state electrolyte particles may be the same or different from the first plurality of solid-state electrolyte particles and/or the second plurality of solid-state electrolyte particles.

With renewed reference to FIGS. 6A and 6B, the method 600 may include removing 640 the releasable substrate 632 and the optional exposed electroactive material layer 627 from each of the one or more second electrodes 622, so as to form a bi-cell bipolar unit, such as the second bi-cell bipolar unit 570B illustrated in FIG. 5. Although not illustrated, the skilled artisan will appreciate that in various variations, the releasable substrate 632 may be removed prior to disposing 630 the free-standing electrolyte membranes 626 between the first electrode 624 and the one or more second electrodes 622.

The method 600 may also be used to form bi-cell bipolar units, such as the first bi-cell bipolar unit 570A illustrated in FIG. 5. In such instances, the first electrode 624 may be a negative electrode, and the one or more second electrodes 622 may be positive electrodes. The method 600 may include preparing a predetermined number of bi-cell bipolar units (including first and second bi-cell bipolar units) using the above described method steps (i.e., 620, 630, 640) and stacking 650 the bi-cell bipolar units to form a bipolar battery stack, such as the battery stack 520 illustrated in FIG. 5.

Figure 7:
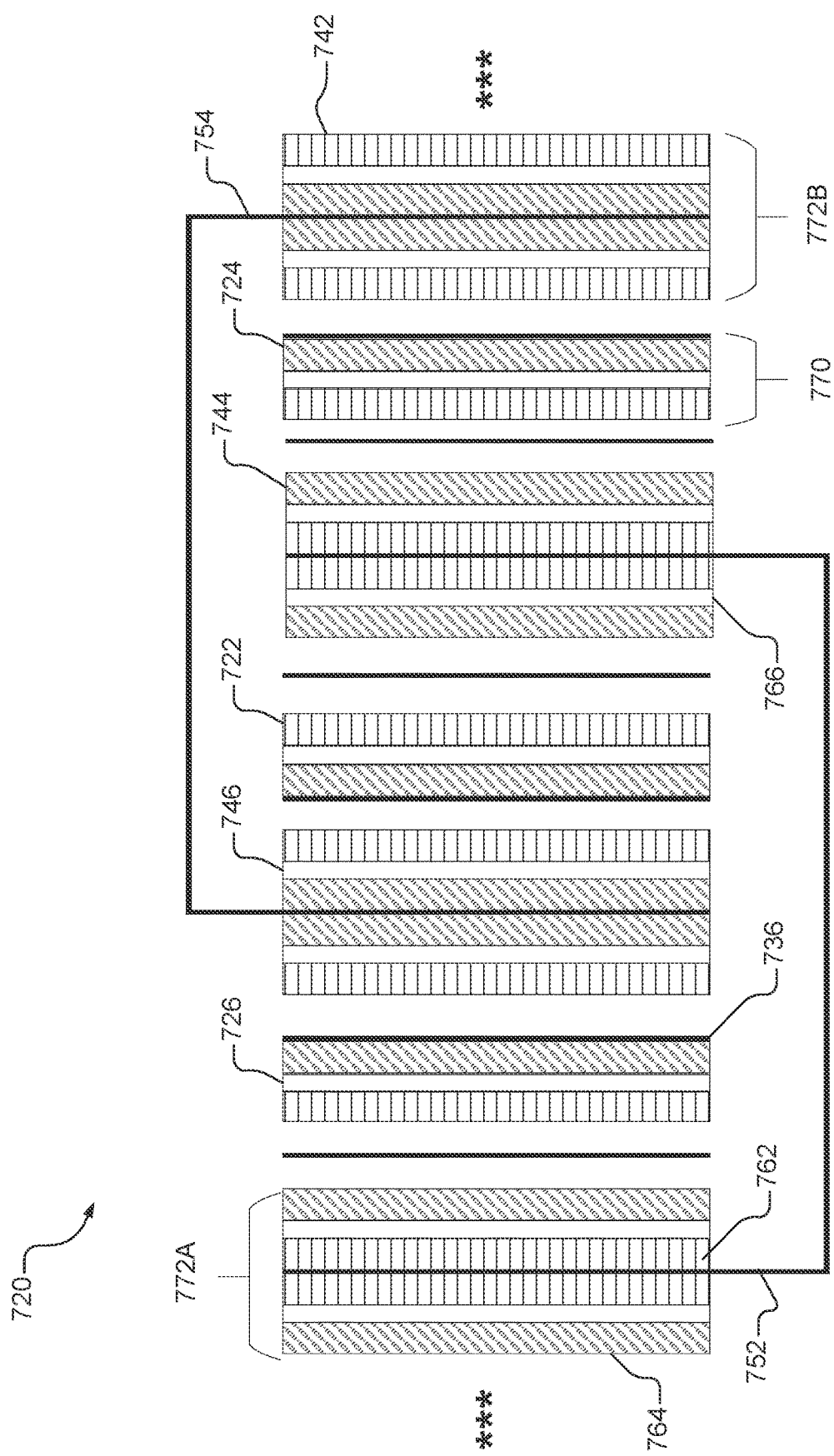
FIG. 7 is another illustration of an example solid-state battery including a combination of single cell bipolar units and bi-cell bipolar units in accordance with various aspects of the present disclosure.

In various aspects, the present disclosure provides solid-state batteries including both single cell bipolar units and bi-cell bipolar units. For example, FIG. 7 illustrates an example solid-state battery including one or more single cell bipolar units 770 and one or more bi-cell bipolar units 772A, 772B. The single cell bipolar units 770 may have a configuration similar to the single cell bipolar units 370 illustrated in FIG. 3, while the one or more bi-cell bipolar units 772A, 772B may have a configuration similar to the bi-cell bipolar cell units 570A, 570B as illustrated in FIG. 5.

For example, each single cell bipolar units 770 may include a first electrode 724 disposed on or adjacent to a first current collector 736 and a second electrode 722 disposed parallel with the first electrode 724. The first electrode 724 may be a positive electrode that is similar to the positive electrode 24 illustrated in FIG. 1. The second electrode 722 may be a negative electrode that is similar to the negative electrode 22 illustrated in FIG. 1. A free-standing electrolyte membrane 726 may be a separating layer disposed between the first electrode 724 and the second electrode 722. Although not illustrated, the skilled artisan will appreciate that in certain variations a plurality of solid-state electrolyte particles may be disposed as a coating or layer on one or more sides of the free-standing electrolyte membrane 726. Similarly, the skilled artisan will appreciate that an electrically conductive adhesive layer may be disposed as a coating or layer on one or more sides of the first current collector 736. The first current collector 736 may be a bipolar current collector. The single cell bipolar units 770 may be prepared using, for example, the method 400 illustrated in FIGS. 4A and 4B.

Each of the second bi-cell bipolar units 772B may include first electrodes 744 disposed on or adjacent to parallel sides of a second current collector 754. The first electrodes 744 may be positive electrodes similar to the positive electrode 24 illustrated in FIG. 1. The first electrodes 744 may be the same as or different from the first electrodes 724. A second electrode 742 may be disposed parallel with each of the first electrodes 724. The second electrodes 742 may be negative electrodes similar to the negative electrode 22 illustrated in FIG. 1. The second electrode 742 may be the same as or different from the second electrodes 722.

Free-standing electrolyte membranes 746 may be separating layers disposed between the first electrodes 744 and the second electrode 742. The free-standing electrolyte membranes 746 may be the same or different from the freestanding electrolyte membranes 726. Although not illustrated, the skilled artisan will appreciate that in certain variations a plurality of solid-state electrolyte particles may be disposed as a coating or layer on one or more sides of each free-standing electrolyte membrane 746. Similarly, the skilled artisan will appreciate that an electrically conductive adhesive layer may be disposed as a coating or layer on one or more sides of the second current collector 754. The second current collector 754 may be same as or different from the first current collector 736. The second bi-cell bipolar units 772B may be prepared using, for example, the method 600 illustrated in FIGS. 6A and 6B.

Each of the first bi-cell bipolar units 772A may include first electrodes 762 disposed on or adjacent to parallel sides of a third current collector 752. The first electrodes 762 may be negative electrodes similar to the negative electrode 22 illustrated in FIG. 1. The first electrode 762 may be the same as or different from the second electrode 722 and/or the second electrode 742. A second electrode 764 may be disposed parallel with each of the first electrodes 762. The second electrode 764 may be positive electrodes similar to positive electrode 24 illustrated in FIG. 1. The second electrode 764 may be the same as or different from the first electrode 724 and/or the first electrode 744.

Free-standing electrolyte membranes 766 may be separating layers disposed between the first electrodes 762 and the second electrode 764. The free-standing electrolyte membranes 766 may be the same or different from the freestanding electrolyte membranes 726 and/or the free-standing electrolyte membranes 746. Although not illustrated, the skilled artisan will appreciate that in certain variations a plurality of solid-state electrolyte particles may be disposed as a coating or layer on one or more sides of each free-standing electrolyte membrane 766. Similarly, the skilled artisan will appreciate that an electrically conductive adhesive layer may be disposed as a coating or layer on one or more sides of the third current collector 752. The third current collector 752 may be same as or different from the first current collector 736 and/or the second current collector 754. The first bi-cell bipolar units 772A may be prepared using, for example, the method 600 illustrated in FIGS. 6A and 6B.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for forming a cell unit for a solid-state battery, the method comprising:
   substantially aligning a first electrode and a second electrode, the first electrode comprising one or more first electroactive material layers disposed on or adjacent to one or more surfaces of a releasable substrate, the second electrode comprising one or more second electroactive material layers disposed on or adjacent to one or more surfaces of a current collector, at least one of the one or more surfaces of the current collector comprising an electrically conductive adhesive layer;
   disposing an electrolyte layer between exposed surfaces of the first electrode and the second electrode; and
   removing the releasable substrate to form the cell unit.

2. The method of claim 1, wherein the releasable substrate is a film having a thickness greater than or equal to about 2 micrometers to less than or equal to about 1,000 micrometers that comprises at least one of a polymer and a metal,
   wherein the polymer is selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof, and
   the metal is selected from the group consisting of: copper, aluminum, titanium, iron, and combinations thereof.

3. The method of claim 1, wherein the one or more first electroactive material layers comprise a first electroactive material layer disposed on or adjacent to a first surface of the one or more surfaces of the releasable substrate and a second electroactive material layer disposed on or adjacent to a second surface of the one or more surfaces of the releasable substrate,
   wherein the one or more second electroactive material layers comprise a first electroactive material layer disposed on or adjacent to a first surface of the one or more surfaces of the current collector and a second electroactive material layer disposed on or adjacent to a second surface of the one or more surfaces of the current collector, wherein removing the releasable substrate comprises removing the releasable substrate and the second electroactive material layer of the one or more first electroactive material layers disposed on or adjacent to the second surface of the one or more surfaces of the releasable substrate, and wherein the cell unit is a bi-cell bipolar unit.

4. A method for forming a cell unit for a solid-state battery, the method comprising:

substantially aligning one or more first electrodes and a second electrode, each of one or more first electrodes comprising one or more first electroactive material layers disposed on or adjacent to one or more surfaces of a releasable substrate and the second electrode comprises one or more second electroactive material layers disposed on or adjacent to one or more surfaces of a current collector, at least one of the one or more surfaces of the current collector comprising an electrically conductive adhesive layer;

disposing a free-standing electrolyte membrane between exposed surfaces of the one or more first electrode and the second electrode; and removing the releasable substrate to form the cell unit.

5. The method of claim 4, wherein the releasable substrate comprises a polymer and further comprises:

greater than 0 wt. % to less than or equal to about 50 wt. % of one or more fillers, wherein the one or more fillers are selected from the group consisting of: aluminum oxide ($Al_2O_3$), silicon dioxide ($SiO_2$), magnesium oxide (MgO), carbon, or any combination thereof.

6. The method of claim 4, further comprising:

before substantially aligning the one or more first electrodes and the second electrode, disposing the one or more second electroactive material layers on the one or more surfaces of the current collector.

7. The method of claim 6, further comprising:

coating the at least one of the one or more surface of the current collector with the electrically conductive adhesive layer, wherein disposing the one or more second electroactive material layers on the one or more surfaces of the current collector comprises disposing the one or more second electroactive material layers on one or more exposed surfaces of the electrically conductive adhesive layer.

8. The method of claim 7, wherein the electrically conductive adhesive layer has a thickness greater than or equal to about 0.5 micrometers to less than or equal to about 20 micrometers and comprises greater than or equal to about 0.1 wt. % to less than or equal to about 50 wt. % of a polymer and greater than or equal to about 0.1 wt. % to less than or equal to about 50 wt. % of a conductive filler.

9. The method of claim 8, wherein the polymer is selected from the group consisting of: epoxy, polyimide (polyamic acid), polyester, vinyl ester, polyvinylidene difluoride (PVDF), polyamide, silicone, acrylic, polyvinylidene difluoride (PVDF), polytetrafluoroethylene (PTFE), ethylene propylene diene monomer (EPDM) rubber, nitrile butadiene rubber (NBR), styrene-butadiene rubber (SBR), lithium polyacrylate (LiPAA), and combinations thereof, and the conductive filler is selected from the group consisting of: carbon black, graphene, carbon nanotubes, carbon nanofibers, gold (Ag), nickel (Ni), aluminum (Al), and combinations thereof.

10. The method of claim 4, wherein the free-standing electrolyte membrane has a thickness greater than or equal to about 1 micrometer to less than or equal to about 200 micrometers.

11. The method of claim 10, wherein the free-standing electrolyte membrane is a polymeric gel layer comprising one or more polymers selected from the group consisting of: poly(acrylonitrile) (PAN), poly(ethylene oxide) (PEO), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof.

12. The method of claim 11, wherein the polymeric gel layer further comprises greater than or equal to about 5 wt. % to less than or equal to about 70 wt. % of a lithium salt, wherein the lithium salt is selected from the group consisting of: lithium bis(trifluoromethylsulfonyl)imide (LiTFSI), lithium tetrafluoroborate ($LiBF_4$), lithium bis(oxalate) borate (LiBOB), lithium difluoro (oxalato) borate (LiODFB), lithium difluorophosphate ($LiPO_2F_2$), lithium fluoride (LiF), and combinations thereof.

13. The method of claim 11, wherein the polymeric gel layer further comprises greater than 0 wt. % to less than or equal to about 80 wt. % of a plasticizer, wherein the plasticizer is selected from the group consisting of: dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols, and combinations thereof.

14. The method of claim 10, further comprising a plurality of solid-state electrolyte particles that form one or more particle layers disposed on or adjacent to one or more surfaces of the free-standing electrolyte membrane.

15. The method of claim 4, wherein the one or more first electroactive material layers comprise a first electroactive material layer that is disposed on or adjacent to a first surface of the one or more surfaces of the releasable substrate, wherein the one or more second electroactive material layers comprise a first electroactive material layer disposed on or adjacent to a first surface of the one or more surfaces of the current collector, and wherein the cell unit is a single cell bipolar unit.

16. The method of claim 4, wherein the releasable substrate is a film having a thickness greater than or equal to about 2 micrometers to less than or equal to about 1,000 micrometers that comprises at least one of a polymer and a metal, wherein the polymer is selected from the group consisting of: polyethylene terephthalate (PET), polypropylene (PP), polyethylene (PE), poly(ethylene naphthalate) (PEN), poly(tetrafluoroethylene) (PTFE), polyimide (PI), poly(ethylene oxide) (PEO), and combinations thereof, and the metal is selected from the group consisting of: copper, aluminum, titanium, iron, and combinations thereof.

17. The method of claim 4, wherein the free-standing electrolyte membrane is a polymeric gel layer comprising:

a polymer selected from the group consisting of: poly (acrylonitrile) (PAN), poly(ethylene oxide) (PEO), polyethylene carbonate (PEC), poly(trimethylene carbonate) (PTMC), or poly(propylene carbonate) (PPC), polyvinylidene difluoride (PVDF), poly(vinylidene fluoride-co-hexafluoropropylene) (PVDF-HFP), and combinations thereof, a lithium salt selected from the group consisting of: lithium bis(trifluoromethylsulfonyl)imide (LiTFSI), lithium tetrafluoroborate (LiBF$_4$), lithium bis(oxalate) borate (LiBOB), lithium difluoro (oxalato) borate (LiODFB), lithium difluorophosphate (LiPO$_2$F$_2$), lithium fluoride (LiF), and combinations thereof, and a plasticizer selected from the group consisting of: dimethyl carbonate (DMC), ethylene carbonate (EC), ethylmethyl carbonate (EMC), propylene carbonate (PC), diethyl carbonate (DEC), methyl propyl carbonate (MPC), fluoroethylene carbonate (FEC), gamma-butyrolactone (GBL), tetraethyl phosphate (TEP), tetrahydrofuran, ethyl acetate, dimethyl sulfoxide, acetonitrile, N-methyl-2-pyrrolidone (NMP), dimethoxyethane, dioxolane, γ-butyrolactone, acetone, N,N-dimethylformamide (DMF), alcohols, and combinations thereof, wherein a plurality of solid-state electrolyte particles form one or more particle layers disposed on or adjacent to one or more surfaces of the free-standing electrolyte membrane.

18. The method of claim 4, wherein one or more surfaces of the current collector is coated with the electrically conductive adhesive layer, wherein the electrically conductive adhesive layer has a thickness greater than or equal to about 0.5 micrometers to less than or equal to about 20 micrometers and comprises greater than or equal to about 0.1 wt. % to less than or equal to about 50 wt. % of a polymer and greater than or equal to about 0.1 wt. % to less than or equal to about 50 wt. % of a conductive filler.

19. The method of claim 4, wherein the one or more first electroactive material layers comprises a first electroactive material layer disposed on or adjacent to a first surface of the one or more surfaces of the releasable substrate and a second electroactive material layer disposed on or adjacent to a second surface of the one or more surfaces of the releasable substrate, wherein the one or more second electroactive material layers comprises a first electroactive material layer disposed on or adjacent to a first surface of the one or more surfaces of the current collector and a second electroactive material layer disposed on or adjacent to a second surface of the one or more surfaces of the current collector, wherein substantially aligning the one or more first electrodes and a second electrode comprises substantially aligning a bottom electrode of the one or more first electrodes with a first exposed surface of the second electrode and substantially aligning a top electrode of the one or more first electrodes with a second exposed surface of the second electrode, wherein removing the releasable substrate comprises removing the releasable substrate and the second electroactive material layer disposed on or adjacent to the second surface of the one or more surfaces of the releasable substrate of the bottom electrode of the one or more first electrodes and the releasable substrate and the second electroactive material layer disposed on or adjacent to the second surface of the one or more surfaces of the releasable substrate of the top electrode of the one or more first electrodes, and wherein the cell unit is a bi-cell bipolar unit.

20. A method for forming a solid-state battery, the method comprising:

stacking two or more cell units, wherein each cell unit is formed by:

substantially aligning a first electrode and a second electrode, the first electrode comprising one or more first electroactive material layers disposed on or adjacent to one or more surfaces of a releasable substrate, the second electrode comprising one or more second electroactive material layers disposed on or adjacent to one or more surfaces of a current collector, at least one of the one or more surfaces of the current collector comprising an electrically conductive adhesive layer;

disposing a free-standing electrolyte membrane between exposed surfaces of the first electrode and the second electrode; and removing the releasable substrate to form the cell unit.

* * * * *